Dec. 31, 1935.   C. F. PYM   2,026,099
MACHINE FOR SHAPING UPPERS OVER LASTS
Filed July 11, 1933   9 Sheets-Sheet 1

INVENTOR
Charles F. Pym
By his Attorney,
Harlow M. Davis

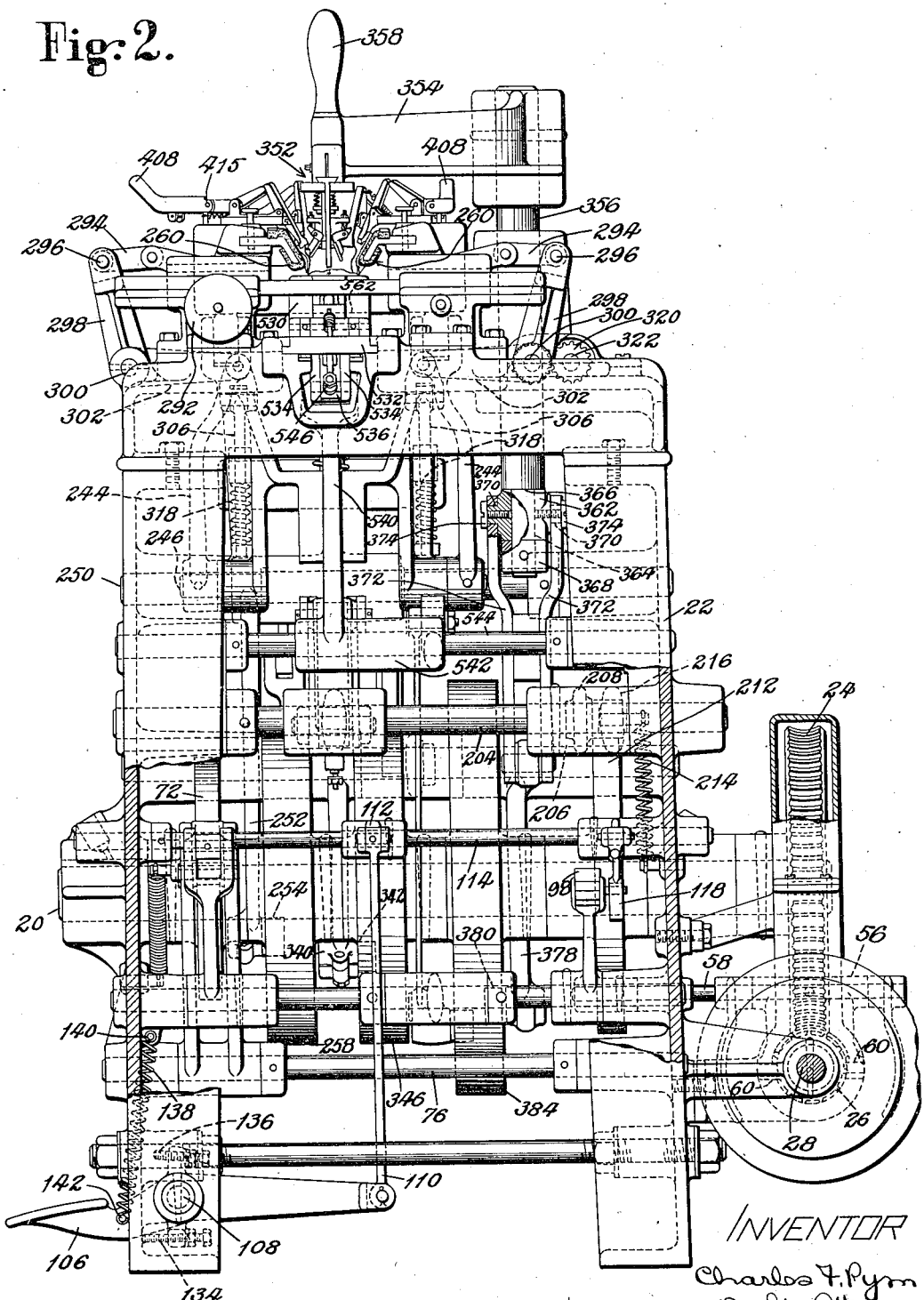

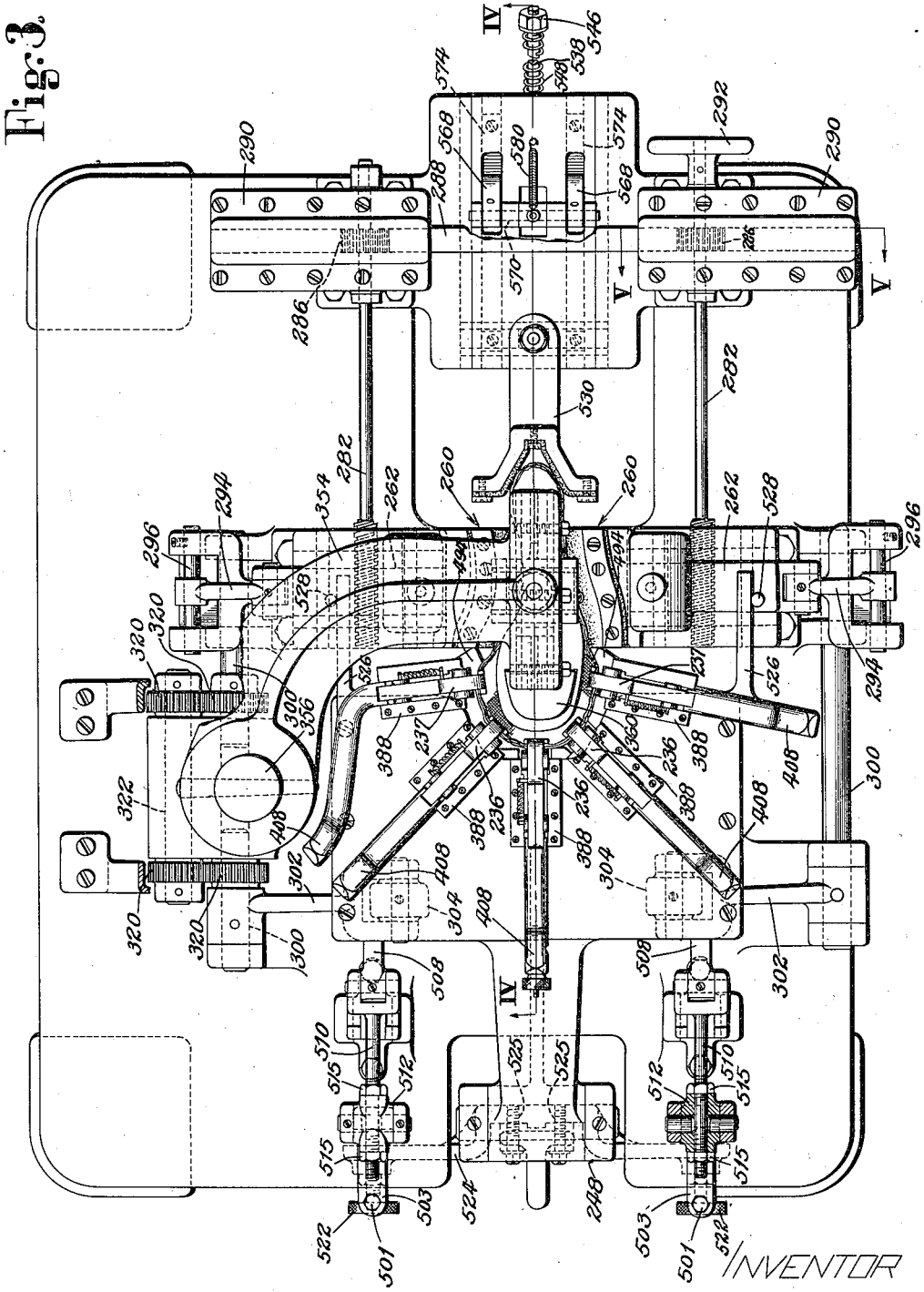

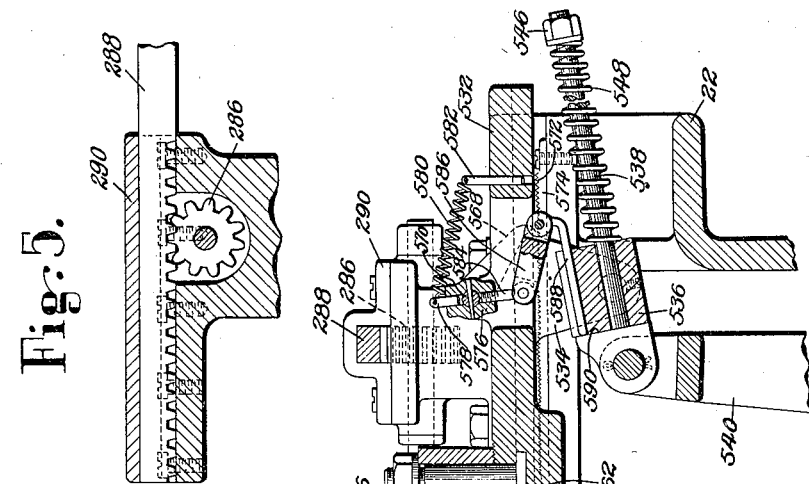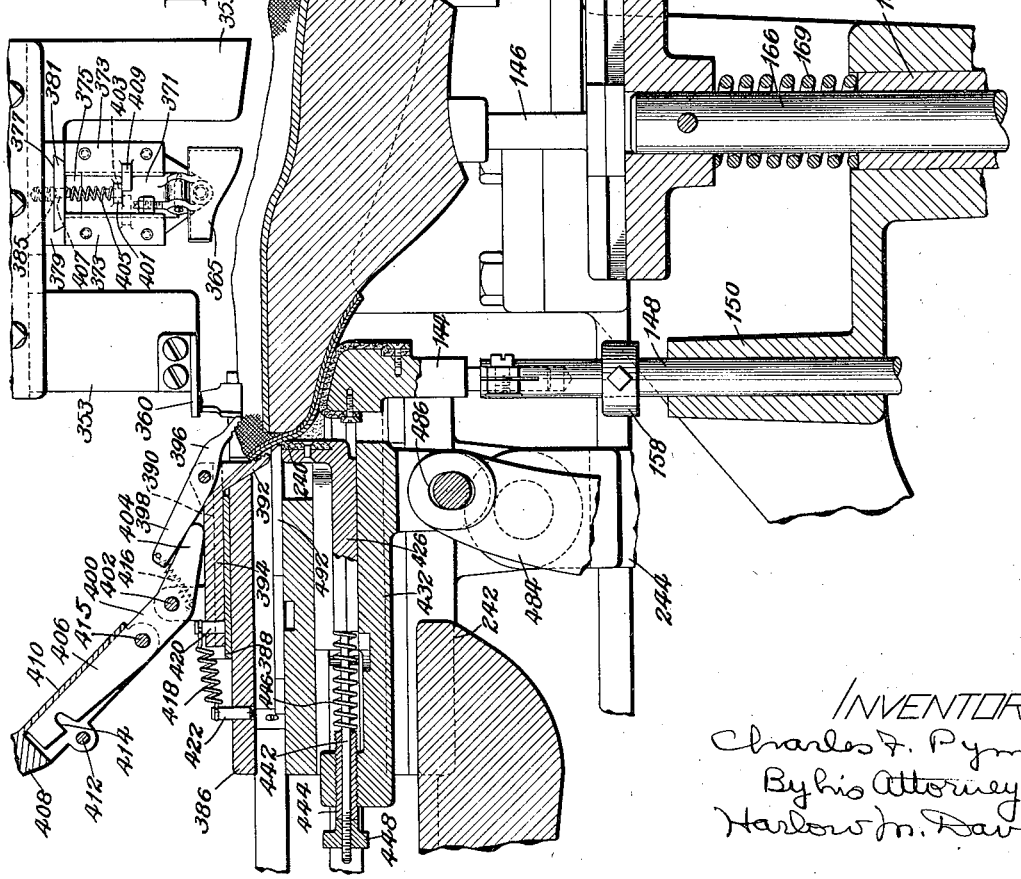

Dec. 31, 1935.   C. F. PYM   2,026,099
MACHINE FOR SHAPING UPPERS OVER LASTS
Filed July 11, 1933   9 Sheets-Sheet 5
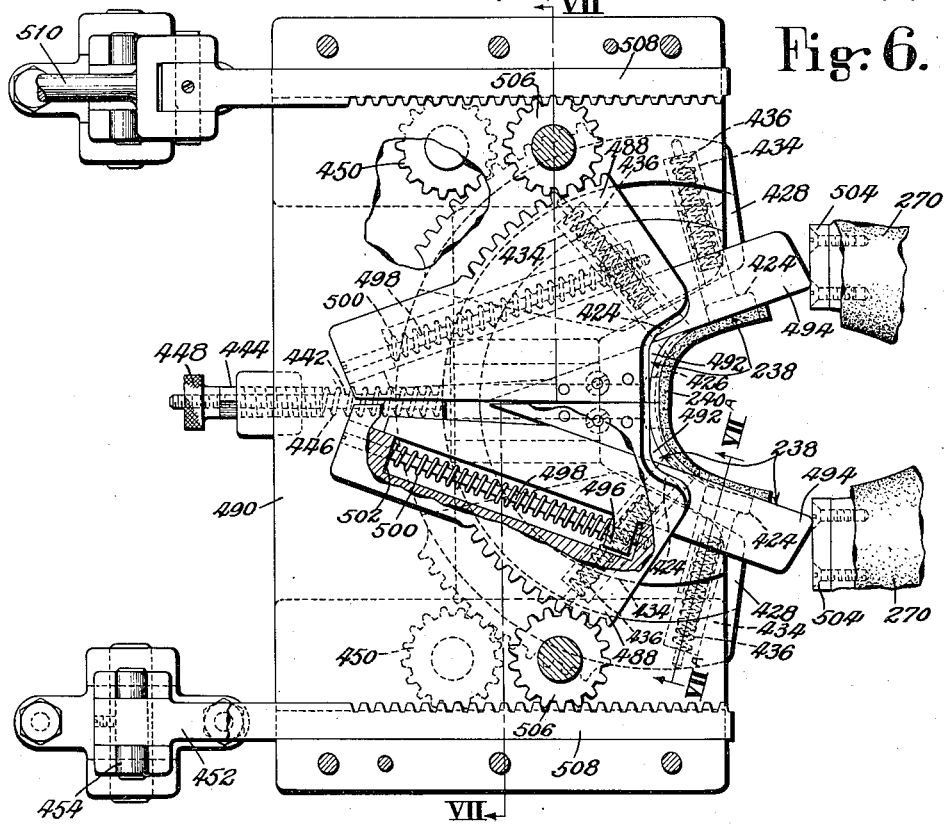
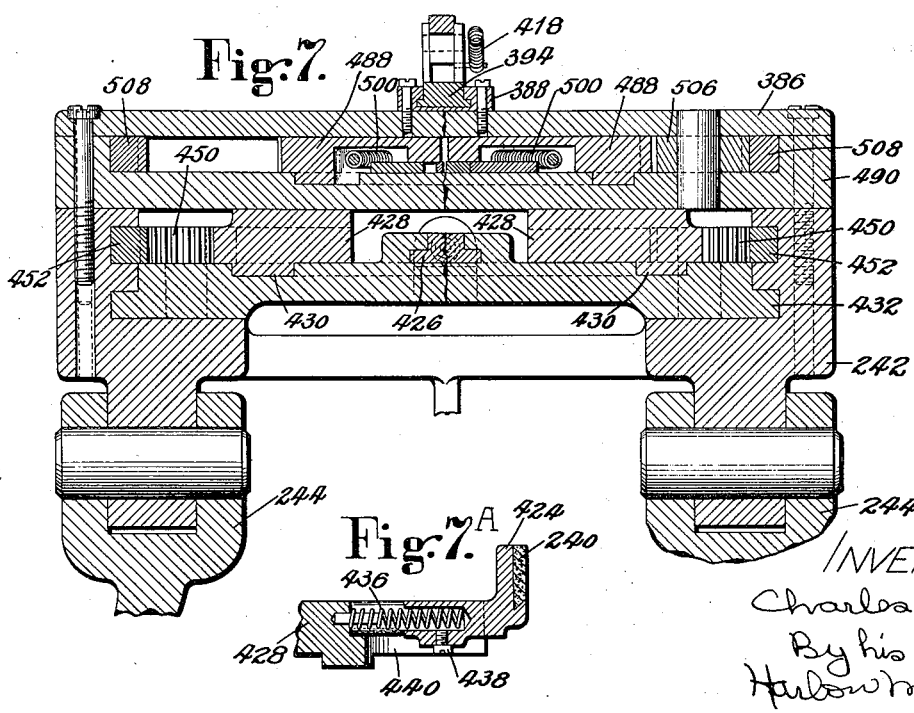
INVENTOR
Charles F. Pym
By his Attorney
Harlow M. Davis Dec. 31, 1935.  C. F. PYM  2,026,099
MACHINE FOR SHAPING UPPERS OVER LASTS
Filed July 11, 1933    9 Sheets-Sheet 6

INVENTOR
Charles F. Pym
By his Attorney
Harlow M. Davis

Dec. 31, 1935.  C. F. PYM  2,026,099
MACHINE FOR SHAPING UPPERS OVER LASTS
Filed July 11, 1933  9 Sheets-Sheet 7

INVENTOR
Charles F. Pym
By his Attorney,
Harlow M. Davis

Dec. 31, 1935.　　　C. F. PYM　　　2,026,099
MACHINE FOR SHAPING UPPERS OVER LASTS
Filed July 11, 1933　　　9 Sheets-Sheet 8
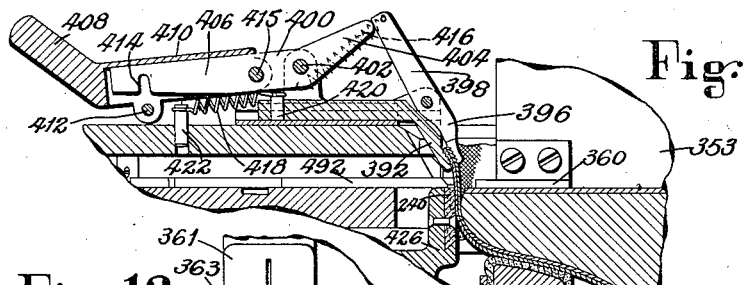
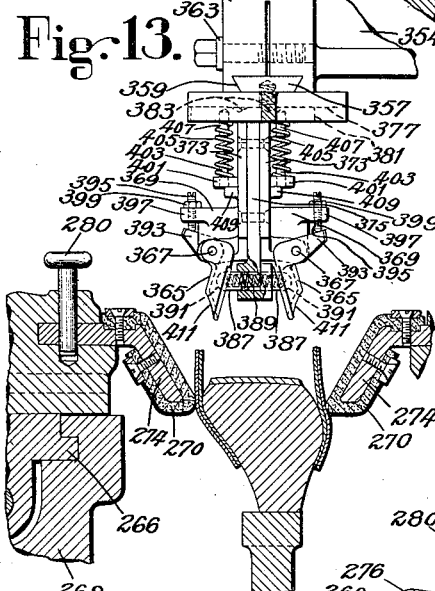
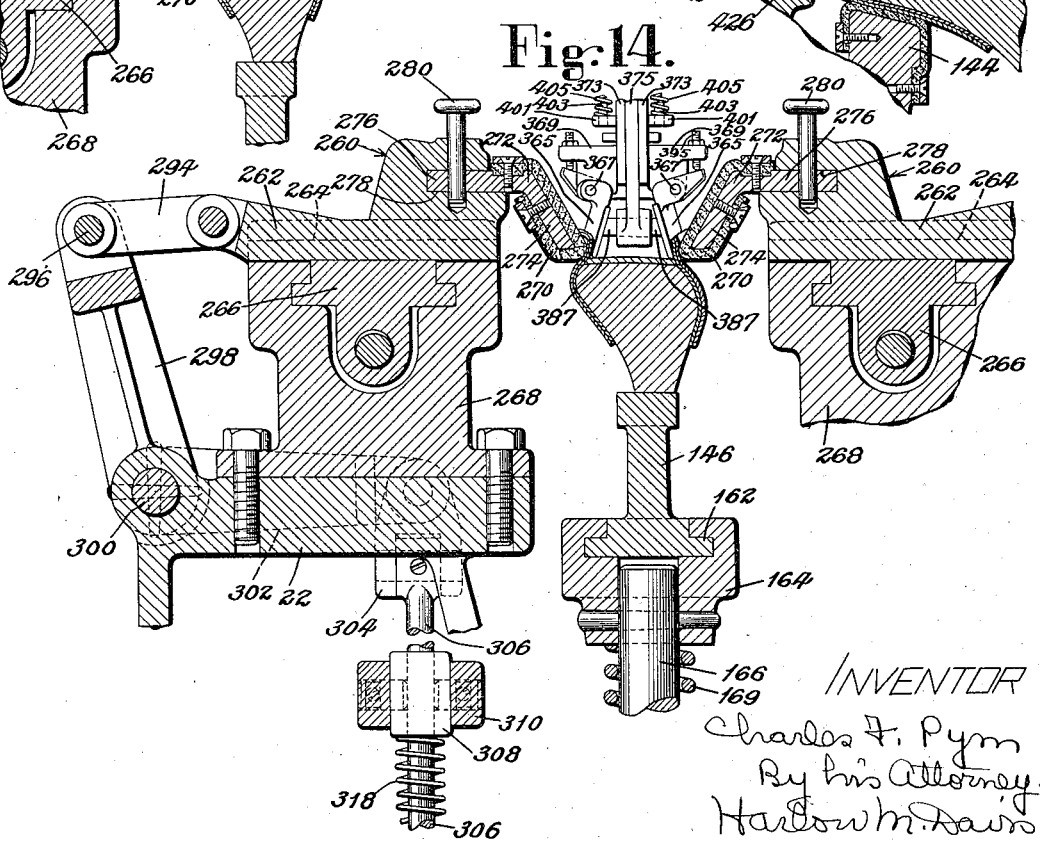
INVENTOR
Charles F. Pym
By his Attorney,
Harlow M. Davis Dec. 31, 1935.　　　　　C. F. PYM　　　　　2,026,099
MACHINE FOR SHAPING UPPERS OVER LASTS
Filed July 11, 1933　　　9 Sheets-Sheet 9
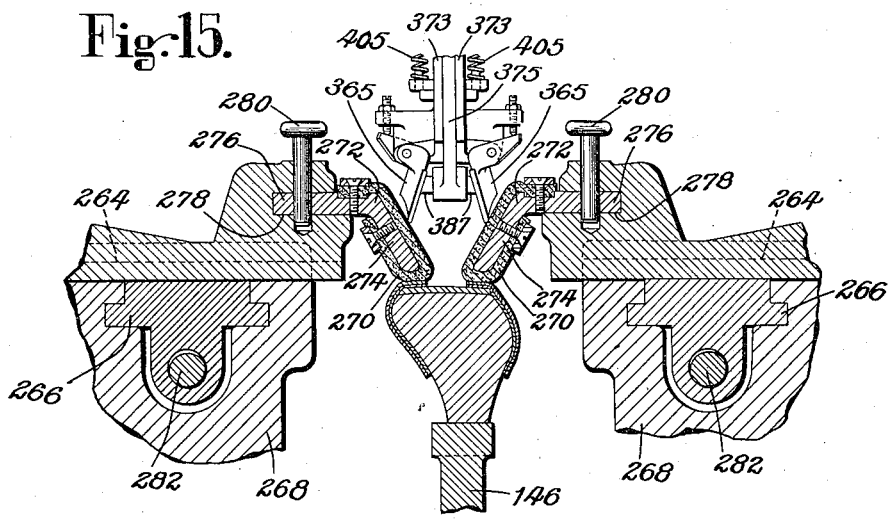
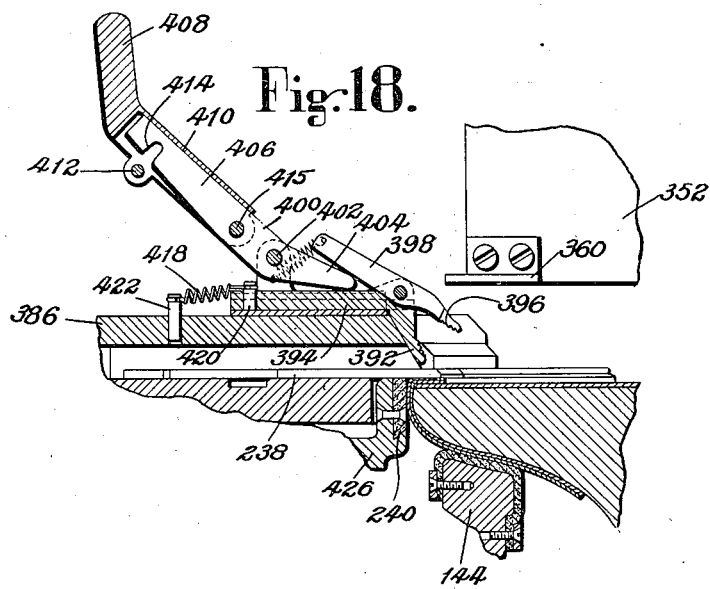
INVENTOR
Charles F. Pym
By his Attorney Patented Dec. 31, 1935

2,026,099

UNITED STATES PATENT OFFICE 2,026,099

MACHINE FOR SHAPING UPPERS OVER LASTS

Charles F. Pym, Beverly, Mass., assignor to United Shoe Machinery Corporation, Paterson, N. J., a corporation of New Jersey Application July 11, 1933, Serial No. 679,925

101 Claims. (Cl. 12—7)

This invention relates to machines for shaping uppers over lasts and is herein shown as embodied in a machine having means for lasting the forepart and shank portions of shoes and adapted for operating upon shoes the margins of the uppers of which in the lasting operation are secured to the insoles by cement. It is an object of the present invention to provide improved means for lasting these different portions of shoes in a single operation, and various important novel features of the invention are accordingly to be recognized in the combination of forepart and shank lasting means. It will be evident, however, that the invention in many of its aspects is not limited to such a combination, but includes various novel and useful features relating more particularly to end or side lasting means.

In the illustrated machine the forepart and shank lasting means are relatively adjustable in directions lengthwise of the shoe to accommodate shoes of different sizes and, in order that these means may operate in different relative positions to lay substantially all portions of the margin of the upper forwardly of the heel breast line inwardly over the insole regardless of the size of the shoe being operated upon, there is provided, in accordance with an important feature of the invention, a novel construction such that the distance along the sides of the shoe that the forepart lasting means extends in effective engagement with the upper is also variable. In the construction shown the forepart lasting means comprises end wiper plates or wipers for operating at the extreme toe end of the shoe and side wiper plates or wipers for operating at the opposite sides of the forepart of the shoe beyond the end plates, the relation between the end plates and the side plates depending upon the above-mentioned relative adjustment of the forepart and shank lasting means. More particularly, as illustrated, the side wiper plates are displaceable lengthwise of the shoe relatively to the end plates to vary the effective lengths of their acting faces in operating upon shoes of different sizes, and such displacement is controlled by the shank lasting means which is adjustable lengthwise of the shoe relatively to the forepart lasting means. Since the shank lasting means, as herein illustrated, is arranged to act on the upper between the heel breast line and the ball line at opposite sides of the shoe, the forepart lasting or wiping means, which may also be termed end lasting or wiping means, embraces the entire forepart of the shoe being operated upon and, in the overlaying operation, acts to lay all portions of the margin of the upper forwardly of those portions acted upon by the shank lasting means inwardly over the insole. It is to be understood that in the novel construction thus provided for accommodating lasting means to shoes of different lengths, the invention is not limited to means that operates on the particular portions of a shoe above mentioned.

Preferably, in accordance with a further feature of the invention, the forepart lasting mechanism is constructed and arranged to locate shoes of different sizes lengthwise in the machine by engagement with their end faces, and is provided for this purpose with a toe end embracing band initially adjustable in directions lengthwise of the shoe relatively to the end embracing wipers and arranged for engagement with the toe end of the shoe to determine its lengthwise position in the machine. The shoe is supported for the operation of the machine by toe and heel rests which are arranged to permit the shoe to be moved lengthwise in the machine into engagement with the toe band, these rests being relatively adjustable in directions heightwise of the shoe to position the shoe with the bottom face of its forepart in a predetermined plane.

For positioning the shoe heightwise in operative relation to the end embracing wipers in the machine herein shown is provided with a holddown arranged for engagement with the insole to depress the shoe to the proper level for the operation of the wipers; and in order to assist in shaping the upper to the contour of the last prior to the overwiping operation, there are further provided, in accordance with a feature of the invention, grippers mounted above the wipers in position to grip the margin of the upper around the end and at opposite sides of the end portion of the shoe, the grippers being arranged during the depression of the shoe to pull the upper over the last and to draw it tightly over the forepart of the last. The wipers and grippers, in the construction shown, are fixed against relative heightwise movement and, in order that the upper will be properly tensioned over the forepart of the last, the grippers are arranged radially about the end of the last to maintain the direction of pull substantially normal to the edge curvature of the last. The grippers are movable toward and from the shoe in a plane substantially parallel with the wipers and are held initially against inward movement toward the shoe by means which is arranged to yield in response to the pull of the upper to permit the grippers to move farther inwardly and thus to assist in drawing the upper close to the lateral faces of the forepart of the last.

For conforming the upper tightly and smoothly to the contour of the shank portion of the last and insole the invention further provides novel shank lasting means, the machine illustrated having opposite shank lasting mechanisms comprising wipers of yieldable material shaped to conform substantially to the longitudinal curvatures of the opposite side edges of the insole both heightwise and laterally of the shoe and arranged to act on the upper between the heel breast line and the ball line at opposite sides of the shoe. The wipers are arranged to engage the upper initially in locations at considerable distances below the bottom face of the insole, and means is provided for holding them yieldingly in engagement with the opposite sides of the shoe to cause them during the depression of the shoe, by frictional contact with the upper, to work it toward the bottom face of the insole, the wipers being thereafter movable to lay the margins of the upwiped portions of the upper inwardly over the insole. In order to eliminate any excessive forward strain on the upper by the grippers as the upper is wiped upwardly and inwardly over the curved surfaces of the shank portion of the last there is provided, as herein illustrated, connections between the grippers at the opposite sides of the forepart of the shoe and the shank lasting wipers arranged to cause said grippers to partake of the inward movements of the wipers. This not only tends to prevent the formation of wrinkles in the shoe upper at the forward ends of the shank lasting wipers, but assists in drawing the upper close to the sides of the forepart of the last, particularly at the ball line.

The above and other features of the invention, including a novel construction and arrangement of wiper operating and controlling means, novel shoe supporting means, and various novel details of construction and combinations of parts will now be more particularly set forth by reference to the accompanying drawings and pointed out in the claims.

In the drawings,

Fig. 2 is a view in right-hand side elevaton of the machine shown in Fig. 1, with parts broken away;

Fig. 3 is a plan view of the machine;

Fig. 4 is a sectional view on the line IV—IV of Fig. 3;

Fig. 5 is a sectional view on the line V—V of Fig. 3;

Fig. 6 is a view partly in plan and partly in section showing the wiper and toe band mechanisms;

Fig. 7 is a sectional view on the line VII—VII of Fig. 6;

Fig. 7A is a sectional view on the line VII$^A$—VII$^A$ of Fig. 6;

Figure 9:
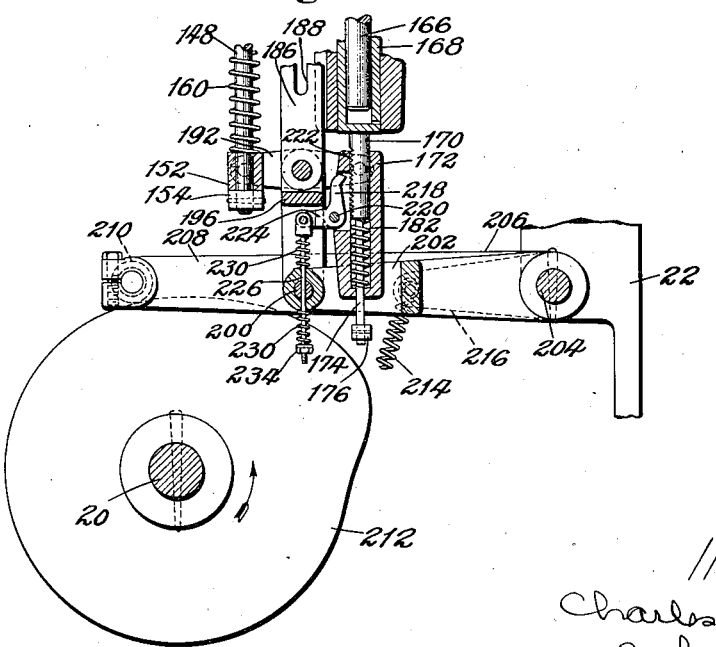
Figure 10:
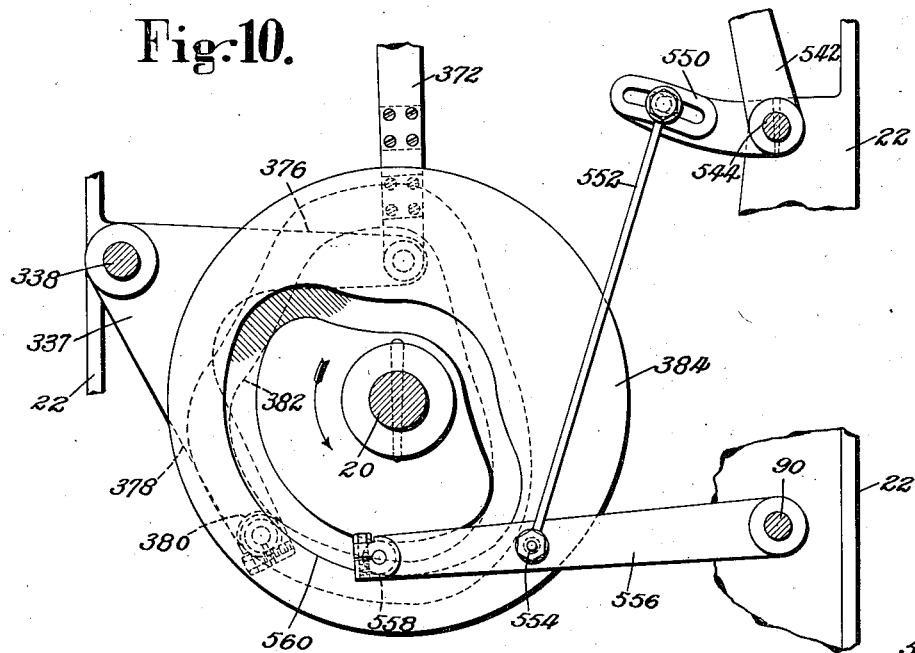
Figure 11:
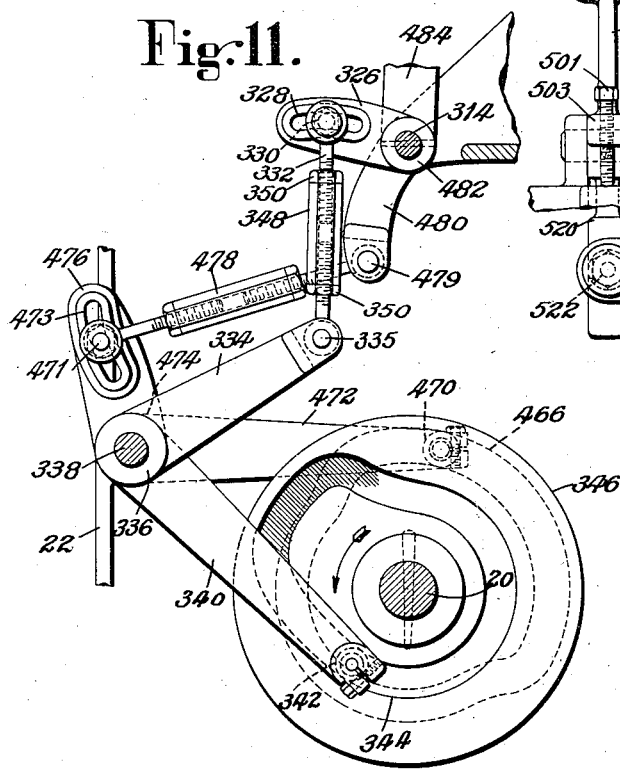
Figure 12:
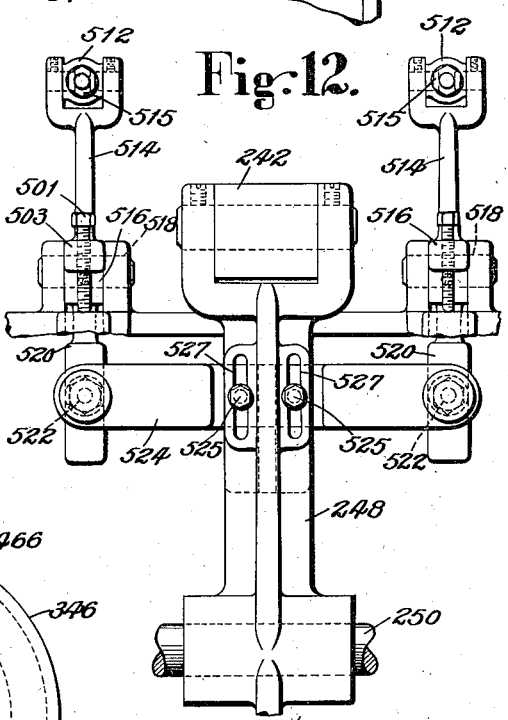

Figs. 9, 10, and 11 are views in front elevation of cam wheels with which the machine is provided and parts associated therewith;

Fig. 12 is a detail view in elevation of a portion of the means for operating the wipers;

Fig. 13 illustrates the relation of the shank lasting wipers to the shoe when the machine is at rest;

Fig. 14 is a view partly in side elevation and partly in section of the shank lasting mechanisms, illustrating the relation of the shank lasting wipers to the shoe at the completion of the upwiping operation;

Fig. 15 illustrates the relation of the shank lasting wipers to the shoe at the completion of the overwiping operation;

Fig. 16 is a view illustrating the relation of the toe grippers, the forepart wipers and the toe band to the shoe during the depression of the shoe by the holddown;

Fig. 17 illustrates the relation of the parts shown in Fig. 16 to the shoe after the holddown has completed its downward movement; and Fig. 18 illustrates the positions of the parts shown in Fig. 16 as the wipers complete their overwiping movement.

Figure 1:
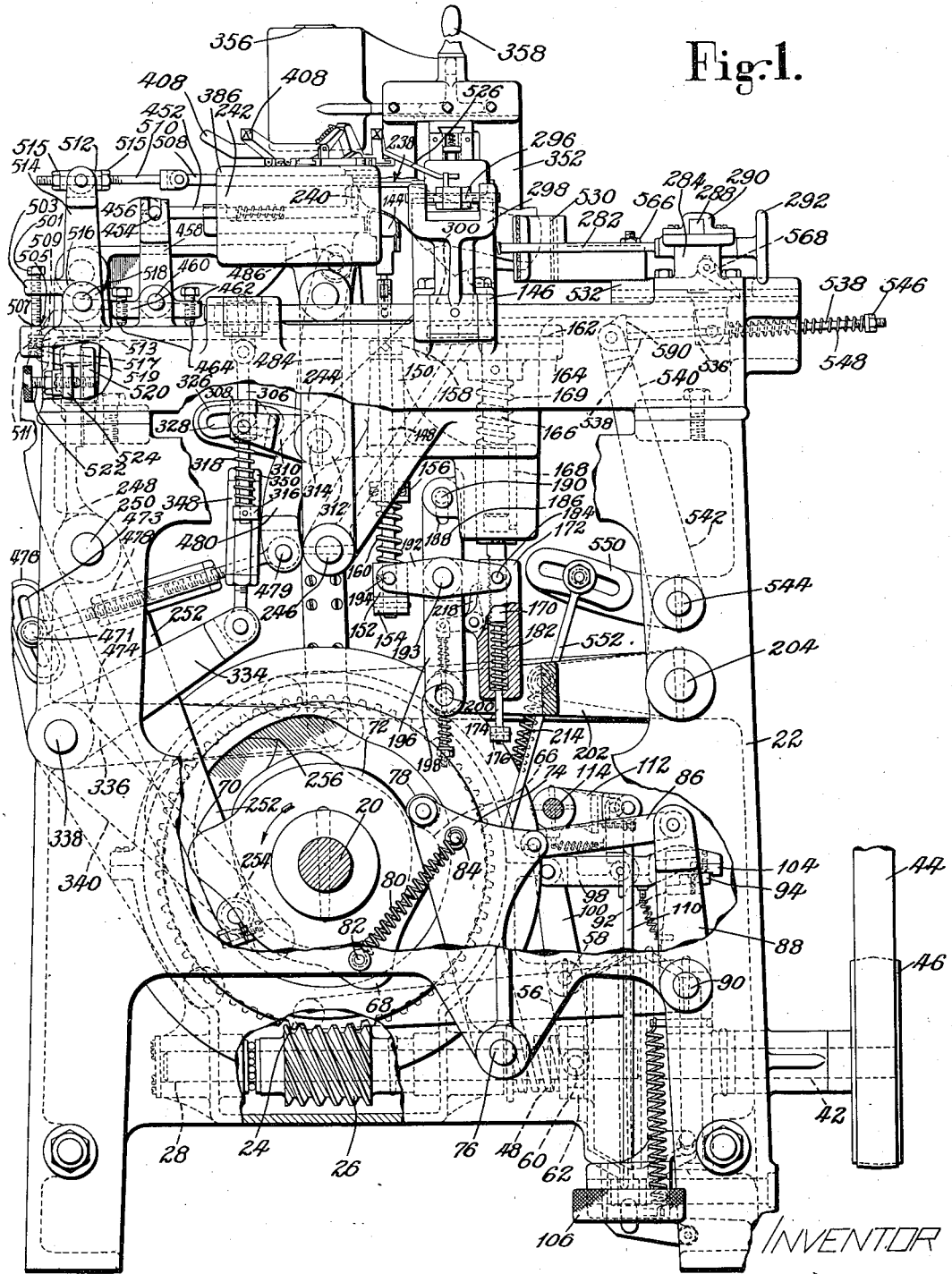
Fig. 1 is a view in front elevation of a machine in which the present invention is embodied, with a portion of the base broken away to show more clearly the operating parts of the machine.
Figure 8:
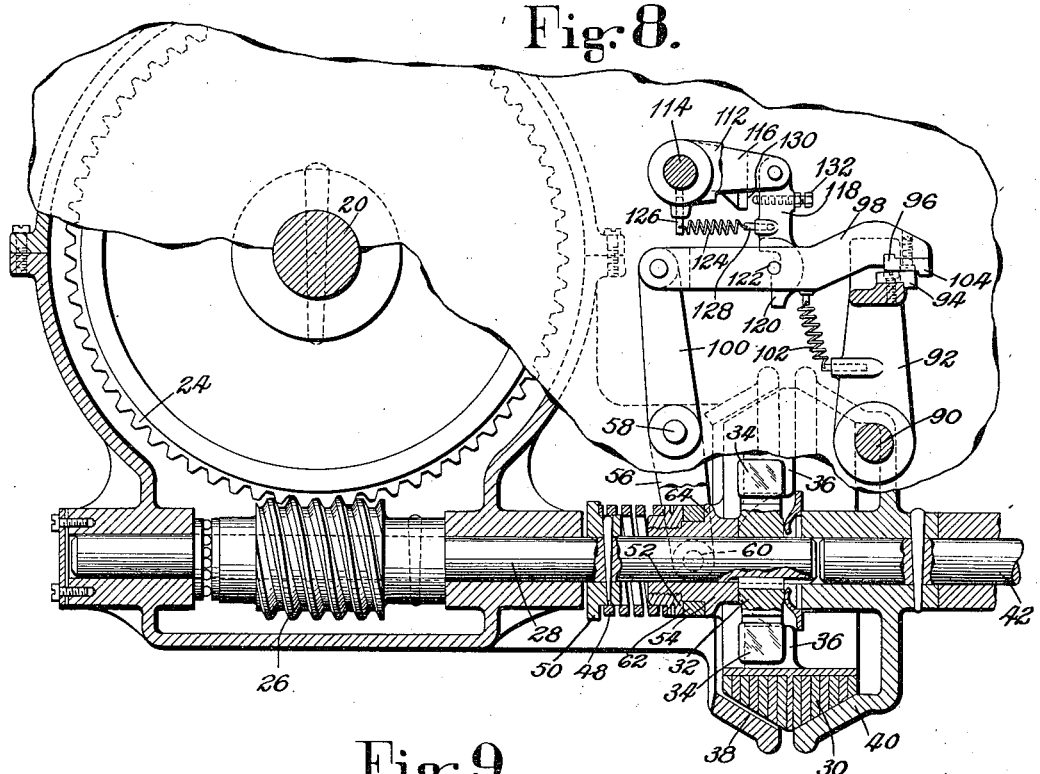
Fig. 8 is a view partly in front elevation and partly in section showing the power driving means and the starting and stopping mechanism.

The illustrated machine is provided with mechanism for lasting the forepart of the shoe and with mechanism for lasting the shank portion of the shoe, which mechanisms are operated and controlled by cams on a cam shaft 20 mounted in suitable bearings in the frame 22 of the machine and which carries a spiral gear 24, Figs. 1, 2 and 8, driven by a worm 26 on a laterally extending shaft 28. Mounted on the shaft 28 is a clutch member 30 connected to the shaft by means of a spider 32 the opposed arms 34 of which slidably engage the cutch member 30 in grooves 36 in the clutch member to permit the latter to be moved lengthwise of the shaft into engagement with a brake surface 38 on one side or into engagement with a driving member 40 on the other side. The driving member 40 is pinned to a short shaft 42, Fig. 8, mounted in the frame 22 in axial alinement with the shaft 28, the shaft 42 and the member 40 being driven continuously by means of a belt 44 (Fig. 1) which engages a pulley 46 fast on the right-hand end of the shaft 42. A spring 48, which bears at one end against a collar 50 pinned to the shaft 28 and at the other end against a sleeve 52 threaded on the reduced end portion of the hub 54 of the member 30, tends to throw the member 30 into driving relation to the member 40 but is compressed by the rocking of a lever 56 in a clockwise direction, as viewed in Fig. 8, to move the clutch member 30 into engagement with the brake surface 38 when the machine is to be stopped.

The lever 56 is pinned to a rock shaft 58 mounted in the frame 22 and, as shown (Figs. 2 and 7), is bifurcated to straddle the hub 54 and is provided with openings through which extend pins 60 which enter corresponding openings in a collar 62 mounted on the hub 54 between the sleeve 52 and a shoulder 64. For rocking the lever 56 in a clockwise direction to stop the machine there are provided three stop cams 66, 68, and 70 carried by a cam disk 72 (Fig. 1) on the cam shaft 20. A cam lever 74 fulcrumed at 76 to the frame carries at its upper end a roll 78 which is held in engagement with the cam disk 72 by a spring 80 one end of which is connected at 82 to the frame and the other end of which is connected at 84 to the cam lever 74. The cam lever 74 is connected by a link 86 to an upwardly extending arm 88 fast to a rock shaft 90 mounted in the frame 22 in parallel relation to the rock shaft 58 and to which there is secured a second arm 92, Figs. 1 and 8, having a plate 94 thereon arranged to engage a plate 96 on a laterally extending arm 98 pivotally connected to the upper end of an upwardly extending arm 100 fast to the rock shaft 58. A spring 102 connecting the arms 92 and 98 tends to hold them in the positions shown in Figs. 1 and 8 with a depending lug 104 on the plate 96 extending below the upper surface of the plate 94. It will be seen that, as the cam lever 74 is swung in a clockwise direction by one or the other of the stop cams, the arm 92 will be swung in the same direction and through the arms 98 and 100 clockwise movement will be imparted to the lever 56 to move the clutch member 30, against the pressure of the spring 48, into engagement with the brake surface 38 to stop the machine.

To start the machine the arm 98 is swung upwardly by depression of a treadle 106 (Fig. 2) to disengage the plates 94, 96 and thus to permit the spring 48 to move the clutch member 30 into engagement with the driving member 40. The treadle 106 is fulcrumed at 108 to the frame 22 and is connected by a rod 110 to an arm 112 fast to a shaft 114 which is mounted in the frame 22 and to which there is secured a second arm 116 (Fig. 8). Pivotally connected to the outer end of the arm 116 is a downwardly extending member 118 having a hook-shaped lower end 120 arranged to engage a pin 122 projecting from the arm 98. A spring 124 connected at one end to a pin 126 in the hub of the arm 116 and at the other end to a pin 128 carried by the member 118 tends to hold the end 120 of the member 118 in engagement with the pin 122. When the arm 98 is swung upwardly by depression of the treadle an abutment 130 on the arm 116 engages an adjustable stop illustrated as a screw 132 carried by the member 118. In the continued depression of the treadle, the arm 118 is accordingly swung by the arm 116 far enough to disengage its hook-shaped end 120 from the pin 122, thus permitting the spring 102 to swing the arm 98 downwardly to move the plate 96 into operative relation to the plate 94 in order that the machine may be stopped automatically even if the operator continues to hold the treadle depressed. As shown particularly in Fig. 2, the treadle 106 is provided with a pair of opposed stops illustrated as screws 134, 136 which are arranged to engage the frame 22 and which may be adjusted to vary the extent of swinging movement imparted to the treadle 106 and the arm 116, and one of which, 134, may be adjusted to vary the initial positions of these parts. The treadle 106 is held normally in raised position, with the stop 134 in engagement with the frame 22, by a spring 138 one end of which is connected at 140 to the frame 22 and the other end of which is connected at 142 to the treadle 106. As illustrated, and for purposes to be explained more particularly hereinafter, the three stop cams on the cam disk 72 are so disposed that the machine is stopped automatically at certain predetermined points in its cycle of operations.

The last with its shoe upper and insole assembled thereon is supported for the operation of the machine by a toe rest 144 and a member 146 which may be conveniently termed a heel rest although it engages the top of the cone of the last somewhat forwardly of the heel end, Figs. 1 and 4. The upper surface of the toe rest 144 is curved to conform substantially to the shape of the top of the toe end of the last and may be covered with leather or other suitable material to prevent marking of the shoe upper. In the illustrated machine the toe and heel rests are mounted for movements in directions heightwise of the shoe and are upheld when the machine is idle by a comparatively light compression spring which acts on both rests as part of an equalizing device through which the two rests are subjected to equal pressures by the spring while permitted to move relatively to each other to adjust themselves to the shoe. As shown, the toe rest is adjustably secured to the upper end of a rod 148 which extends downwardly through a bearing 150 in the frame 22 and has slidably mounted on its lower end portion a block 152. Pinned to the end of the rod 148 and engaging the block 152 is a collar 154, and clamped to the rod, one on each side of the bearing 150, are adjustable collars 156, 158. Surrounding the rod 148 between the collar 156 and the block 152 is a stiff compression spring 160. The heel rest 146 is slidably mounted for movement lengthwise of the shoe in ways 162 formed in a member 164 pinned to the upper end of a rod 166 which extends downwardly in a central bore (Figs. 1 and 9) in a bushing 168 slidably mounted in the frame 22 in parallel relation to the rod 148. Surrounding the rod 166 between the bushing 168 and the member 164 is a stiff compression spring 169, the capacity of which is substantially the same as that of the spring 160. Formed integral with the bushing 168 is a rod 170 which is surrounded by a sleeve 172 bored for nearly its entire length to receive the rod, the rod being provided with a reduced end portion 174 which extends through an opening in the lower end of the sleeve and has pinned to its lower end a collar 176. Surrounding the reduced end portion 174 of the rod 170 and bearing at one end against a shoulder on the rod and at the other end against a shoulder on the sleeve is a comparatively light compression spring 182. The sleeve 172 is provided with trunnions 184 to which there are pivotally connected, one on each side of the sleeve, equalizing levers 192 the opposite ends of which are pivotally connected to trunnions 194 formed on the block 152 on the rod 148. Intermediate their ends, the levers 192 are pivoted at 193 to the upper end of a link 196 in the lower end of which there is formed a slot 198 to receive a pin 200 carried by an arm 202 pinned to a rock shaft 204 mounted in the frame 22. The equalizing levers 192 are supported by a link 186 which is pivoted at 193 to the bifurcated upper end of the link 196 and has formed in its upper end a slot 188 through which extends a pin 190 carried by the frame of the machine. When the machine is initially at rest the pin 190 is arranged to engage the link 186 at the upper end of the slot 188 and, with the pin in this position in the slot, the link 196 is upheld with the pin 200 engaging it at the lower end of the slot 198. Fast to the rock shaft 204 is a lever 206 having a forwardly extending arm 208 carrying a cam roll 210 arranged to engage a power cam 212 on the cam shaft 20. A spring 214 connected at one end to the frame 22 and at the other end to a second arm 216 with which the lever 206 is provided tends to hold the cam roll 210 in engagement with the cam 212. From the above description it will be readily seen that the spring 182 acts through rod 170 and spring 169 to uphold the heel rest 146, and through the sleeve 172, equalizing levers 192 and spring 160 to uphold the toe rest 144, and that through the swinging of the levers 192 about their pivot 193 equal, but opposite, movements of the toe and heel rests 144, 146 in directions heightwise of the shoe are permitted so that the rests will adjust themselves to the shoe when the work is presented to the machine. By adjustment of the toe rest 144 relatively to the rod 148, permitted by a split bearing at the upper end of the rod, the heightwise positions of the rests 144, 146 may be varied to support the shoe and last in the desired heightwise position in the machine.

For locking the sleeve 172 to the rod 170 at a predetermined time in the cycle, for a purpose hereinafter more fully described, there is provided a pawl 218 pivoted at 220 to the sleeve 172 and arranged to engage ratchet teeth 222 formed on the rod 170. The pawl 218 has an arm 224, and pivotally connected to the outer end of the arm is a rod 226 which extends downwardly through the arm 202 and the pin 200. Surrounding the rod 226, one on each side of the arm 202, are equalizing springs 230 one of which bears against the upper side of the arm and a shoulder 232 on the rod and the other one of which bears against the under side of the arm and a nut 234 threaded on the end of the rod. The springs 230 tend to hold the pawl 218 in any position into which it may be moved by the arm 202 which is so positioned when the machine is initially at rest that the pawl is held out of engagement with the ratchet teeth 222 to permit the toe and heel rests 144, 146 to be upheld by the spring 182.

In the course of the operation of the machine, as hereinafter more fully explained, the shoe is depressed, by pressure applied to its bottom face, against the resistance of the spring 182 which is compressed by the downward movement of the rests 144, 146 through the opposite movements of the rod 170 and the sleeve 172, the spring acting with equal forces on both the rests. During the depression of the shoe, the springs 160, 169, which as previously pointed out are considerably heavier than the spring 182, remain fully expanded and act substantially as solid members. At a predetermined time in the cycle of the shaft 20 and preferably, as pointed out more particularly hereinafter, at the time when the margin of the upper is being laid inwardly over the insole, the arm 202 is swung upwardly, by the action of the cam 212 on the lever 206, and acts through the spring 230 to swing the pawl 218 into engagement with one of the ratchet teeth 222 on the rod 170, thereby locking the sleeve 172 to the rod 170 and throwing the spring 182 out of operation, i. e., preventing further compression of the spring. As the cam 212 continues to swing the arm 202 upwardly the pin 200 engages the link 196 at the upper end of the slot 198, after which the levers 192 are moved upwardly through the link 196 to compress the springs 160, 169 and thus to increase the pressure of the overlaying means on the margin of the shoe upper. It will be seen that the link 186 moves relatively to the pin 190 as the levers 192 are moved upwardly and that since the levers 192 are held against swinging movement by reason of the locking of the sleeve 172 to the rod 170, the springs 160, 169 are compressed equal amounts. The configuration of the cam 212 is such that when it is desired to return the parts to their starting positions, the springs 160, 169 are permitted to expand fully, after which the spring 214 acts to swing the arm 202 downwardly to unlock the sleeve 172 and the rod 170 and through the engagement of the pin 200 with the link 196 at the lower end of the slot 198 to move the levers 192 and the link 186 downwardly until the pin 190 engages the link 186 at the upper end of the slot 188.

The forepart lasting mechanism, later to be described in detail, and comprising grippers 236, 237 (Fig. 3) for engaging the upper at the toe end and at opposite sides of the forepart, wipers 238 for laying the upper in over the edge of the shoe bottom around the toe end and along the opposite sides of the forepart of the shoe, and a toe end embracing band 240, is mounted above the frame 22 in a carrier 242 (Fig. 1). The carrier 242 is pivotally connected near its front end to the upper ends of a pair of links 244 (Figs. 1 and 2) fast to a laterally extending shaft 246 mounted in the frame 22. At its outer end the carrier is pivotally supported on the upper end of a lever 248 which is fulcrumed at 250 to the frame and has a downwardly extending arm 252 carrying a roll 254 engaged by a path cam 256 formed in one side of a cam wheel 258 on the shaft 20.

For lasting the sides of the shank portion of the shoe there are provided opposite shank lasting mechanisms, Figs. 2 and 3, each of which comprises a lasting device 260 secured to a carrier 262 which is mounted for movements toward and from the shoe in ways 264 formed in a member 266 slidably mounted for movements lengthwise of the shoe on a support 268 secured to the frame 22, Fig. 4. Each lasting device comprises a molded member or wiper 270 of yielding frictional material, for example, rubber, and a holder 272 having a downwardly inclined portion 274 for supporting the member 270 and a shank portion 276 extending into a slot 278 in the carrier 262. The members or wipers 270 are shaped to conform substantially to the curvatures of the edge of the last bottom, or the edge of an insole on the last, both heightwise and laterally of the last and as shown are of sufficient lengths to engage the opposite sides of the shoe from points substantially at or somewhat to the rear of the heel breast line forwardly to the ball line. Each lasting device is removably secured to its carrier by a pin 280 so that it may be replaced by a lasting device of different shape for lasting a shoe of different style. For positioning the lasting devices in proper relation to the sides of the shoe mounted upon the toe and heel rests 144, 146, there is provided in the illustrated machine manual means for imparting to the members 266 adjusting movements in the same direction lengthwise of the shoe. Each member 266 has threaded therein a rod 282 the outer end portion of which is rotatably mounted in a bracket 284 secured to the frame 22. Mounted in the brackets 284 and secured to the rods 282 are equal pinions 286 the teeth of which mesh with teeth formed upon a rack bar 288 (Fig. 5). The rack bar 288 is slidably mounted in ways formed in cover plates 290 on the brackets 284. Fast to the outer end of one of the rods 282 is a hand wheel 292 for rotating that rod, the construction being such that as that rod is rotated by the hand wheel, the other rod, through the pinions 286 and the rack bar 288, is rotated in the same direction so that both the lasting devices are adjusted in unison.

The carrier 262 of the front shank lasting mechanism has pivotally connected to its outer end a link 294 through the outer end of which extends a pin 296 carried by the spaced upwardly extending arms of a forked lever 298 fast to a rock shaft 300 mounted in the frame 22. Pinned to the rock shaft 300 is a rearwardly extending arm 302 which is connected by a short link 304 to the upper end of a rod 306 (Figs. 1 and 14) which extends downwardly through a block 308 pivotally supported on the outer end of an arm 310 fast to a rock shaft 314 mounted in suitable bearings in the frame 22. Surrounding the rod 306 between the block 308 and a collar 316 pinned to the lower end of the rod is a compression spring 318. The carrier 262 of the rear shank lasting mechanism is connected to the rock-shaft 314 by mechanism which is substantially the same as that described above for connecting the carrier 262 of the front shank lasting mechanism to the rock shaft, the shaft 300, however, of the rear mechanism being formed in two parts to prevent interference with other parts of the machine and the two parts of the shaft being geared together by equal pinions 320, Fig. 3, through a short intermediate shaft 322 mounted in the frame 22. The opposite shank lasting devices 260 are held in engagement with each other by the springs 318 when the machine is at rest prior to the beginning of its cycle. These devices are accordingly displaced by the operator as he mounts a shoe on the toe and heel rests 144, 146 which are so positioned at this time that the devices 260 in their displaced positions engage the opposite sides of the shoe a considerable distance below the edge of the shoe bottom (Fig. 13). Pinned to the rock shaft 314 is an arm 326 (Figs. 1 and 11) provided with an arcuate slot 328 through which extends the shank portion of a bolt 330. To this bolt there is pivotally connected the upper end of a link 332 the lower end of which is pivotally connected at 335 to the upwardly extending arm 334 of a lever 336 fulcrumed on a shaft 338 in the frame 22. The lever 336 has a downwardly extending arm 340 carrying a roll 342 engaged by a path-cam 344 formed in one side of a cam wheel 346 on the shaft 20. In order to adjust the initial tension of the springs 318 the link 332 is formed in two parts, the oppositely threaded end portions of which are connected by a turn buckle 348 which is held in adjusted position on the two parts of the link by lock nuts 350. When the machine is initially at rest the arcuate slot 328 formed in the arm 326 is concentric with the pivot 335 of the link 332. It will be seen that by adjusting the position of the bolt 330 in the slot 328 the effective length of the arm 326 may be varied to impart more or less turning movement to the rock-shaft 314 by the action of the cam 344 on the lever 336 to compress the springs 318.

After the opposite shank lasting devices 260 have been adjusted lengthwise of the shoe to position them properly relatively to the shank portion of the shoe, the margin of the upper around the toe end and at opposite sides of the forepart of the shoe is gripped by the grippers 236, 237 of the forepart lasting mechanism. The operator then swings a holddown 352 with which the machine is provided into position over the shoe bottom. The holddown 352 is carried by an arm 354 which is pinned to the upper end of a shaft 356. The shaft 356 is rotatably mounted in the frame 22 and the arm 354 is provided with a handle 358 by means of which it may be swung by the operator to move the holddown into and out of operative position over the shoe bottom. As shown, particularly in Fig. 4, the holddown 352 is formed in two parts comprising a forward arm 353 to the lower end of which there is secured a plate 360 for engaging the toe end of the insole, the plate 360 having an edge contour similar to the contour of the toe end portion of the insole to hold it in proper relation to the bottom of the last, and a rear arm 355 for engaging the insole at the heel end. In order to accommodate shoes of different lengths the arms 353, 355 of the holddown are adjustable in directions lengthwise of the shoe. As shown, the arms are provided at their upper ends with tongues 357 (Fig. 13) slidably mounted in a groove 359 formed in the end portion 361 of the arm 354. The end portion 361 is slotted lengthwise above the groove 359, the two parts of the slotted portion being connected by clamp screws 363 by means of which they may be moved toward each other to clamp the arms 353, 355 in any positions of adjustment into which they may be moved. The shaft 356 is supported by a block 362 (Fig. 2) which surrounds a reduced end portion 364 of the shaft between a shoulder 366 formed on the shaft and a collar 368 pinned to the shaft. Formed on the block 362 are trunnions 370 to which are pivotally connected links 372 held in position thereon by cap screws 374, and the links are connected at their lower ends to the outer end of one arm 376 of a bell-crank lever 337 (Fig. 10) which is fulcrumed on the shaft 338 and is provided with a downwardly extending arm 378 carrying a roll 380 engaged by a path cam 382 formed in one side of a cam wheel 384 on the shaft 20. The configuration of the cam 382 is such that at a predetermined time in the cycle of the shaft 20 the arm 378 is swung in a direction to lower the shaft 356 to move the holddown into engagement with the insole and then to depress the shoe and the rests 144, 146 relatively to the grippers 236, 237 and the shank lasting devices 260 against the resistance of the spring 182 as hereinbefore described. As the shoe is depressed, the grippers 236, 237 pull the upper forwardly on the last and draw it tightly over the forepart of the last. At the same time the shank lasting devices 260 act to upwipe the upper along the sides of the shoe to conform it to the shank portion of the last. The illustrated machine is provided with means arranged to engage the shank portion of the insole and to hold its opposite marginal portions yieldingly against the bottom of the last until the shank lasting wipers have begun to lay the marginal portions of the upper over the insole, comprising shank holddown members 365 which are curved both laterally and heightwise of the shoe to conform substantially to the curvatures of the opposite edges of the insole. Each member 365, Figs. 4, 13 and 14, is pivotally connected at 367 to a lug 369 on a slide 371 mounted for movement in directions heightwise of the shoe in a guideway formed by the opposite edge portions of a pair of plates 373 secured to a member 375 slidably mounted for movements in directions laterally of the shoe in a guideway 377 formed in the forwardly projecting portion 379 of the rear arm 355 of the holddown 352. The member 375 has a tongue 381 in the guideway 377, the tongue being provided with a pair of recesses 383 either one of which is arranged to be engaged by a spring-pressed plunger 385 carried by the forward portion 379 to determine the position of the members 365 laterally of the machine in operating upon right and left shoes. The member 375 is provided at its lower end with a bore for supporting a pair of spring-pressed plungers 387 which surround the opposite end portions of a spring 389 and which engage spherical seats 391 formed in the members 365 and urge them outwardly. Tail portions 393, with which the members 365 are provided, limit their outward movements by engagement with adjustable screws 395. The screws 395 extend through ears 397 on the lugs 369 and are held in adjusted positions by lock nuts 399. By adjusting the screws 395 the members 365 may be swung toward or from each other to vary the distance between their insole engaging edges to accommodate shoes of different widths.

Each slide 371 has a projecting lug 401 carrying a pin 403 arranged to center a spring 405 the upper end of which surrounds a pin 407 carried by the member 375. The springs 405 tend to hold the slides 371 with the lugs 401 in engagement with stops 409 on the plates 373. The position of the stops 409 heightwise of the machine is such, however, that as the holddown 352 is moved downwardly the members 365 engage the opposite edge portions of the shank of the insole before the plate 360 and the rear arm 355 move into engagement with the toe and heel end portions of the insole, the springs 405 yielding to permit this relative movement. The members 365 are thus moved into positions to press the opposite margins of the shank portion of the insole yieldingly against the bottom of the last during the depression of the shoe and until after the wipers 270 have begun their movements inwardly over the insole to lay the margin of the upper against the insole. As shown, the members 365 are provided with slightly concaved upper-engaging faces 411 which, as the wipers 270 move inwardly, act to bend the margins of the upper around the curved forward edges of the wipers. As the wipers continue their inward movements the margins of the upper are thus clamped against the wipers by the members 365 which, as they are swung inwardly about their pivots 367 in response to the pressure of the wipers thereon, act to hold successive portions of the margin of the upper out of engagement with the insole until each successive portion is pressed against the insole by the advancing wipers.

As shown, particularly in Figs. 3 and 4, the carrier 242 for the forepart-lasting mechanism is provided with a cover plate 386 upon the upper surface of which there are mounted a plurality of blocks 388 provided with guideways 390 in which are slidably mounted the grippers 236, 237 for engaging the shoe upper around the toe end and at opposite sides of the forepart. In order that the shoe engaging surfaces of each gripper will be maintained substantially parallel to the portion of the upper to be seized the blocks 388 are disposed in directions substantially normal to the edge curvature of the shoe bottom. Since the grippers 236, 237 are identical in construction, a description of one will suffice for all. Each gripper comprises a jaw 392 formed upon the forward end of a slide 394 and a gripper jaw 396 pivoted to the forward end of the slide 394 and provided with a tail 398 by means of which it may be swung about its pivot toward the jaw 392 to grip the margin of the shoe upper. This is accomplished in the illustrated machine by a lever 400 pivoted at 402 to the slide 394, which lever is provided with a nose portion 404 underlying the tail 398 of the gripper jaw 396. The lever 400 has an arm 406 to which there is pivotally connected at 415 a handle 408 having an upwardly extending portion arranged to be grasped by the hand of the operator. The handle 408 has an overhanging portion 410 which, as the handle is swung downwardly, engages the upper surface of the arm 406 and swings it in a direction to elevate the nose portion 404, which by engagement with the tail 398 causes the gripper jaw 396 to swing toward the gripper jaw 392 to grip the shoe upper. In its elevated position (Fig. 16) the nose portion 404 of the lever 400 is at right angles to the tail 398 so that the gripper jaws 392, 396 are locked in upper gripping position. As the handle 408 is swung reversely a pin 412 carried by the handle enters a notch 414 in the arm 406 and swings the arm upwardly to lower the nose 404 and thus to permit a spring 416, which is connected to the tail 398 and the slide 394, to swing the jaw 396 away from the jaw 392 to release the shoe upper. Each slide 394 is held initially in retracted position in its guideway 390 with the gripper jaw 392 in engagement with the end of the cover plate 386 by a spring 418 which is connected at one end to a pin 420 carried by the slide and at the other end to a pin 422 projecting from the cover plate 386.

The toe-end embracing band 240 of the forepart lasting mechanism as shown particularly in Figs. 4, 6, and 7A, comprises a U-shaped strip of leather or other suitable material carried by supports or holders 424 located at the corners and at the opposite sides of the band and a support 426 for the front end of the band. The supports 424 are slidably mounted in holders 428 (Fig. 7) which are provided with arc-shaped ribs 430 guided in corresponding recesses formed in a plate 432, so that the holders are mounted for swinging movements about an axis located substantially at the toe end of the shoe. The plate 432 is mounted for movements in directions lengthwise of the shoe in ways formed in the carrier 242. The supports 424, as shown particularly in Fig. 7A are mounted in slots 434 in the holders 428 and are provided with recesses for receiving springs 436 which bear at their outer ends against the holders 428 at the ends of the slots 434 and thus tend to urge the supports 424 inwardly with the heads of stop screws 438 carried by the holders 424 in engagement with the holders 428 at the forward ends of slots 440 formed in the holders in alinement with the slots 434. The support 426 for the front end of the band is slidably mounted in the plate 432 and has an outwardly extending rod 442 which projects through a bushing 444 threaded into the plate 432. Surrounding the rod 442 between the inner end of the bushing and the end of the support 426 is a spring 446 the initial tension of which may be varied by adjustment of the bushing. Threaded on the end of the rod 442 is a knurled nut 448 which is held in engagement with the outer end of the bushing 444 by the spring 446 and which may be turned to move the support 426 toward or from the shoe to vary the position of the front end of the band lengthwise of the shoe relatively to the wipers 238, the band 240 slipping in the holders 424 as it is adjusted relatively to the wipers. When the shoe is presented to the machine the toe band 240 is in its open position and acts as a stop or gage for positioning the shoe lengthwise in the machine.

For closing the toe band 240 about the toe end of the shoe as it is forced more firmly against the end of the toe by the movement of the plate 432 there are pivotally mounted on the plate 432 gears 450 the teeth of which engage teeth formed on the edges of the holders 428 and also teeth formed on rack bars 452 slidably mounted in ways formed in the carrier 242. At its outer end each rack bar 452 (Fig. 1) carries a pin 454 the opposite end portions of which enter lengthwise slots 456 formed in the forked upper end of a lever 458 fulcrumed at 460 to the frame 22. Each lever 458 has oppositely extending lugs 462 carrying screws 464 which engage the frame 22 and by means of which the lever 458 may be swung about its pivot to adjust the toe band 240 to accommodate shoes of different sizes. From the above description it will be evident that inward swinging movements will be imparted to the holders 428 to close the toe band about the end of the shoe in response to lengthwise movement of the plate 432 relatively to the rack bars 452. For imparting to the plate 432 its lengthwise movement to close the toe band in proper time relation to other operations there is provided a path cam 466 (Fig. 11) formed in one side of the cam wheel 346 on the shaft 29. The cam 466 is engaged by a roll 470 carried by the laterally extending arm 472 of a lever 474 fulcrumed on the shaft 338. The lever 474 is provided with an upwardly extending arm 476 to which there is adjustably connected one end of a link 478 the opposite end of which is connected at 479 to one arm 480 of a bell-crank lever 482 fulcrumed on the shaft 314. The lever 482 has an upwardly extending arm 484 connected by a pin and slot connection 486 to the plate 432. In order that more or less closing movement may be imparted to the toe band to take care of variations in the shapes of different toes, the link 478, as shown in Fig. 11, is pivotally connected to a bolt 471 the shank portion of which extends through an arcuate slot 473 formed in the arm 476. When the machine is initially at rest the slot 473 is concentric with pivot 479 of the link 478. By adjusting the position of the bolt 471 in the slot 473 the effective length of the arm 476 may be varied to vary the extent of forward movement imparted to the plate 432.

The forepart wipers 238 are mounted in the carrier 242 on holders 488 which are mounted on a plate 490 for swinging movements about the same axis as the toe band holders 428. The wipers are shaped to conform substantially to the shape of the toe end of the shoe, and in order that all portions of the upper forwardly of the shank lasting devices 269 will be wiped in over the edge of the shoe bottom, the wipers comprise end members or plates 492 secured to the holders 488 and side members or plates 494 slidably mounted in the holders and positioned lengthwise of the shoe by the shank lasting devices 269, Figs. 4 and 6. The side members 494 are provided with laterally extending lugs 496 through which extend rods 498 carried by the holders 488. Springs 500 surrounding the rods 498 between the lugs 496 and shoulders 502 formed on the holders act at all times to hold the side members with their forward ends in engagement with stops 504 carried by the opposite shank lasting devices. The side members 494 are thus always under the control of the shank lasting devices, so that whatever may be the adjusted positions of the latter the shoe is lasted all along the sides of the forepart and shank.

For imparting to the wipers their swinging or closing movements as they are advanced lengthwise of the shoe by the carrier 242 the plate 490 has pivotally mounted thereon gears 506 the teeth of which mesh with teeth formed upon the edges of the holders 488 and also with teeth formed on rack bars 508 slidably mounted on the plate 490. The rack bars 508 extend outwardly through the rear end of the carrier 242 and have pivotally connected to their outer ends adjustable rods 510 (Figs. 1 and 12) threaded through blocks 512 which are pivotally connected to the upper ends of arms 514 of levers 516 fulcrumed at 518 to the frame 22. Each lever 516 has a downwardly extending arm 520 which is arranged to be engaged by an adjustable stop illustrated as a screw 522 carried by a member 524 adjustably secured to the upwardly extending arm of the previously-mentioned lever 248. As shown, the member 524 is secured to the arm by bolts 525, the shank portions of which extend through lengthwise slots 527 formed in the arm.

Each arm 514 of the levers 516 carries an adjustable stop illustrated as a screw 501 which is threaded through a lug 503 (Figs. 1 and 12) in the arm and is arranged, when the parts are in the positions shown in Figs. 1 and 12, to engage a spring-pressed plunger 505 mounted in the from 22 of the machine. As shown each plunger 505 is provided with a reduced end portion 507 which extends through a bore 509 in the frame 22 and an enlarged portion 511 which is held against the frame 22 at the upper end of an enlarged portion 513 of the bore 509 by a spring 517 the tension of which may be varied by adjustment of a screw 519 threaded into the lower end of the enlarged portion of the bore. As the lever 248 is swung about its pivot to move the carrier 242 toward the shoe the levers 516 move with the carrier, thereby moving the stops 501 away from the plungers 505 until the stops 522 engage the arms 520 of the levers 516. Thereafter as the lever 248 continues to swing in the same direction the stops 522 swing the levers 516 to move the rack bars in a direction opposite to the direction of movement of the carrier and thus to impart closing movement to the wipers. At the end of the forward movement of the carrier the levers 516 will have been swung an amount sufficient to close the wipers and to move the stops 501 again into engagement with the plungers 505. As the lever 248 is swung in the opposite direction to move the carrier away from the shoe the levers 516 and the rack bars 508 are held against movement with the carrier by engagement of the stops 501 with the plungers 505 so that the wipers are swung away from each other during this movement of the carrier.

It will be understood that the stops 501 are adjustable to take care of variations in the extent of swinging movements imparted to the levers 516 by reason of the adjustment of the stops 522 to vary the time in the forward movement of the carrier when the wipers begin their closing movements, or by reason of the adjustment of the member 524 to vary the extent of closing movements imparted to the wipers, and that in the normal operation of the machine the plungers 505 are intended to act substantially as solid members to hold the levers 516 against swinging movements as the carrier 242 is moved away from the shoe. In order, however, to prevent damage to the various parts of the wiper operating mechanism if the operator fails to adjust the stops 501 as may be necesssary by reason of the adjustment of the stops 522 or of the member 524, or of both, the tension of the springs 517 is such that they will yield to permit displacement of the plungers 505 if the wipers have been fully opened before the carrier has completed its movement away from the shoe, or if the stops 501 engage the plungers 505 before the levers 516 have completed their swinging movements to close the wipers in the movement of the carrier toward the shoe.

As shown in Figs. 1 and 3, the rods 510 are held in adjusted positions relatively to the blocks 512 by lock nuts 515 which are threaded on the rods and are arranged to engage the opposite end faces of the blocks. It will be seen that by adjustment of the rods 510 the initial positions of the wipers may be adjusted to accommodate shoes of different sizes and shapes. It will be seen also that by adjustment of the screws 522 the time in the forward movement of the carrier 242 when the wipers begin their closing movements may be varied and that by adjustment of the member 524 toward or from the fulcrum of the lever 248 the extent of swinging movement of the wipers laterally of the shoe may be varied to insure that the margin of the upper for substantially its entire width will be wiped inwardly over the insole.

From the above description, it will be readily seen that as the carrier is moved toward the shoe the end plates 492 both advance and close, while the side plates move only in directions laterally of the shoe, the springs 500 being compressed somewhat in the wiping operation. One advantage of this is that there is no tendency to displace unduly lengthwise of the shoe the portions of the margin of the upper along the sides of the forepart.

As previously stated, as the shoe is depressed by the holddown 352 the upper is pulled lengthwise of the last and drawn tightly up over the forepart by the grippers 236, 237 and it is also wiped upwardly around the toe end by the toe band 240 which is closed about the toe early in the downward movement of the holddown by the movement of the plate 432 toward the shoe. It will be understood also that as the shoe is depressed the upper along the sides of the shoe is up-wiped by the shank lasting devices 260 which are pressed yieldingly against the sides of the shoe through the springs 318.

In order to eliminate any excessive forward strain on the upper along the sides of the shoe as the upper is wiped upwardly and inwardly over the curved surface of the last at the shank portion by the shank lasting devices 260, the grippers 237 which engage the upper not far from the ball line at opposite sides of the shoe are moved inwardly toward the shoe in response to inward movement of the shank lasting devices. As shown, particularly in Figs. 1 and 3, the handles 408 of the grippers 237 are provided with laterally extending arms 526 arranged to be engaged by pins 528 projecting from the carriers 262 of the opposite shank lasting mechanisms. It will be evident that as the carriers 262 move toward the shoe the pins 528 will engage the arms 526 and move the grippers 237 against the tension of the springs 418 toward the shoe to carry those portions of the upper just forwardly of the shank lasting devices inwardly as the upper is wiped inwardly by the shank lasting devices.

The holddown 352 is arranged to lower the shoe to the proper level for the operation of the wipers, at which time the stop cam 66 arrives in position to stop the operation of the machine, as hereinbefore explained. For supporting the shoe against the thrust of the wipers in the overwiping operation there is provided a member 530 which is moved yieldingly toward the shoe and locked in engagement with the heel end thereof before the holddown 352 has completed its downward movement. The member 530 is removably secured to the forward end of a slide 532 which is mounted in ways formed in the top of the frame 22 for movements toward and from the shoe (Figs. 1, 3 and 4). The slide 532 is provided with depending lugs 534 for pivotally supporting a block 536 through which extends a rod 538 pivotally connected to the upper end of one arm 540 of a lever 542 fast to a shaft 544 mounted in the frame 22. Surrounding the rod 538 between the block 536 and a nut and washer 546 on the end of the rod is a compression spring 548. The lever 542 has a laterally extending arm 550 to which there is adjustably secured a link 552, the lower end of which is pivotally connected at 554 (Fig. 10) to a lever 556 journaled on the shaft 90 and carrying at its outer end a roll 558 arranged to engage a path cam 560 formed in one side of the cam wheel 384 on the shaft 20, the construction being such that at a predetermined time in the cycle of the shaft 20, and preferably during the last portion of the downward movement of the holddown 352, the lever 542 is swung in a counter-clockwise direction to move the member 530 through the spring 548 into supporting relation to the heel end of the shoe. The member 530, as shown particularly in Fig. 3, is provided with diverging arms which may be faced with leather or other suitable material and which are arranged to engage the opposite sides of the heel end of the shoe.

In order that the member 530 may be moved into engagement with the heel end of the shoe without tending to displace it laterally, it is adjustably secured to the forward end of the slide 532 which, for this purpose, is provided with a T-shaped slot 562 to receive the similarly shaped head of a bolt 564 which extends upwardly through the member 530 and has on its upper end a nut and washer 566 for clamping the member 530 to the slide in adjusted position. Corrugations on the underside of the member 530 and upon the upper surface of the slide assist in holding the member 530 and the slide 532 against relative movement in directions lengthwise of the shoe.

For locking the member 530 in engagement with the heel end of the shoe there are provided ratchet plates 574 secured to the frame 22, the teeth of which are arranged to be engaged by pawls 568 fast on a short shaft 570 fulcrumed on the slide 532. Fast to the median portion of the shaft 570 is a block 576 from which projects a pin 578, and connected to the pin is one end of a spring 580 the other end of which is connected to a pin 582 in the slide 532. Threaded into the underside of the block 576 is a short eye bolt 584 which is connected by a short link 586 to a member 588 slidably mounted in a bore in the block 536. The rod 538 which extends through the block 536 is provided with a shoulder 590 which, when the parts are in their idle positions, is arranged to engage the end of the member 588 and thus to hold the pawls 568 against the tension of the spring 580 out of engagement with the ratchet teeth 572. As the lever 542 is swung in a counterclockwise direction, as viewed in Fig. 1, the spring 548 acts on the block 536 to move the slide 532 toward the shoe until the member 530 engages the heel end of the shoe. As the lever 540 continues to swing in the same direction the spring 548 yields and the shoulder 590 releases the member 588, thereby permitting the spring 580 to swing the pawls 568 toward the fixed ratchet plates 574. The pawls 568 are so disposed that at least one of them will be effective to lock the member 530 against rearward movement from shoe-supporting position.

In the operation of the machine, briefly summarized, the operator first moves the shank lasting devices 260 away from each other a distance sufficient to permit an assembled shoe to be mounted on the toe and heel rests 144, 146 with the toe end of the shoe in engagement with the toe band 240, which determines the lengthwise position of the shoe in the machine, after which the opposite shank lasting devices are released to permit the shank lasting members 270 to engage the opposite sides of the shoe. The operator then inserts the margin of the upper around the toe end at opposite sides of the forepart within the gripper jaws 392, 396 of the toe and side grippers 236, 237, and swings the handles 408 downwardly to close the gripper jaws on the upper and by means of the handle 358 swings the holddown 352 in position over the shoe bottom. Thereafter the machine is started by depression of the treadle 106 whereupon the holddown 352 moves downwardly to depress the shoe and the toe band 240 is closed about the toe end of the shoe by the forward movement of the slide 432. As the shoe is depressed the upper is pulled lengthwise of the last and drawn tightly over the forepart by the grippers 236, 237 and is up-wiped around the toe end by the toe band 240 and along the opposite sides of the last by the shank wipers 270, the inward movement of the wipers 270 over the rounded lateral faces of the last being imparted to the grippers 237 by engagement of the pins 528 with the arms 526 (Fig. 3). Substantially at the end of the downward movement of the holddown to depress the shoe the heel end supporting member 530 is moved into supporting relation to the heel end of the shoe, after which the machine is stopped by the action of the cam 66 on the lever 74.

Before the machine is stopped by the action of the cam 66 on the lever 74 the cam 256 acts to impart to the lever 248 a swinging movement in a clockwise direction (Fig. 1) of sufficient extent to cause the wipers 238 to be advanced and partially closed to the edge of the shoe bottom, as illustrated in Fig. 17, thus clamping the upper against the edge of the insole. It will be understood that the downward movement of the holddown 352 to lower the shoe to the proper level for the operation of the wipers has been completed before the cam 256 thus acts on the lever 248. It will be understood also that the initial tension of the springs 318 is comparatively light so that as the shank lasting devices 260 complete their movements inwardly over the curved lateral faces of the last to press the upper against the opposite sides of the insole (Fig. 14) the friction of the devices on the upper is sufficient to prevent them from moving farther inwardly over the insole at this time.

After the machine has been brought to a stop the operator swings the handles 408 upwardly to open the grippers 236, 237, and release the margin of the upper. With a pair of hand pincers the operator may then make any necessary adjustment of the upper on the last after which cement may be applied to the margins of the shoe upper material, if it has not been previously applied, whereupon the machine is again started by depression of the treadle 106. The cam 256 then imparts to the lever 248 a further swinging movement in the same direction to complete the advancing and closing movements of the wipers 238. Substantially at the same time the cam 344 acts to swing the lever 336 in the direction further to compress the springs 318 and thereby to force the shank lasting wipers 270 inwardly over the shoe bottom to lay the margin of the upper against the insole. As the wipers 238 begin their advancing and closing movements over the edge of the shoe bottom from the position shown in Fig. 17, the cam 382 acts to move the holddown 352 upwardly away from the shoe bottom to permit upward pressure to be applied to the shoe through the comparatively stiff compression springs 160, 169, as hereinbefore described. At the same time the cam 466 swings the lever 474 in a clockwise direction to move the plate 432 relatively to the carrier 242 to operate the toe band 240 to release the shoe upper to prevent any reverse wiping action on the upper as the shoe is moved upwardly by the springs 160, 169.

When the wipers have reached the limit of their closing movement the stop cam 68 arrives in position to stop the operation of the machine. The machine is stopped at this point in its cycle with the margin of the upper from the heel breast line on one side of the shoe around the toe end to the heel breast line at the opposite side of the shoe upheld with compacting pressure against the shank lasting wipers 270 and the forepart wipers 238 by the springs 160, 169, to permit the cement which has been previously applied to set sufficiently to retain the upper in lasted position. After the cement has set sufficiently to hold the upper in lasted position the machine is again started by the depression of the treadle. The cam 212 is so formed that as the machine is again started the springs 160, 169 are permitted to expand fully to relieve the pressure of the shoe on the wipers, after which the sleeve 172 is unlocked from the rod 170 to permit the spring 182 again to become operative to uphold the rests 144, 146. After the sleeve 172 is unlocked from the rod 170 the cam 256 swings the lever 248 in a counterclockwise direction to move the carrier 242 to the left (Fig. 1) to open the wipers. As the wipers are swung away from each other laterally of the shoe the cam 382 (Fig. 10) acts through the bell-crank lever 337 and links 372 to lower the holddown 352 into position to engage the bottom of the shoe and to depress the shoe relatively to the wipers before the wipers are moved outwardly over the edge of the shoe bottom. Substantially at the same time upward movement is imparted to the lever 556 (Fig. 10) by the cam 560 to swing the lever 542 in a clockwise direction. As the lever 542 is swung in a clockwise direction the shoulder 590 on the rod 538 (Fig. 4) engages the forward end of the member 588 and moves it relatively to the block 536 to swing the pawls 568 out of engagement with the ratchet teeth 572 to unlock the heel end supporting member 530 after which, as the lever 542 continues to swing, the shoulder 590 engages the block 536 and moves the member 530 into inoperative or idle position. As the shoe supporting member is moved rearwardly the cam 382 swings the bell-crank lever 337 in a direction to move the holddown 352 upwardly out of engagement with the shoe bottom, after which the stop cam 70 swings the lever 74 in a direction to move the clutch member 30 into engagement with the brake surface 38 to stop the operation of the machine. The operator then grasps the handle 358 and swings the holddown 352 to the right. He then moves the shank lasting devices 260 away from each other, after which the shoe may be removed from the machine.

Having described the invention, what I claim as new and desire to secure by Letters Patent of the United States is:

1. In a lasting machine, end lasting means and side lasting means relatively adjustable lengthwise of a shoe to accommodate shoes of different sizes, said end lasting means comprising different parts arranged to act on the shoe upper and relatively adjustable in directions lengthwise of the shoe in response to the relative adjustment of said end and side lasting means.

2. In a lasting machine, end lasting mechanism and side lasting mechanism relatively adjustable lengthwise of a shoe to accommodate shoes of different sizes, said end lasting mechanism comprising a plurality of wiper plates relatively adjustable in directions lengthwise of the shoe in response to the relative adjustment of said end and side lasting mechanisms.

3. In a lasting machine, end lasting mechanism and side lasting mechanism relatively adjustable lengthwise of a shoe to accommodate shoes of different sizes, said end lasting mechanism comprising end wiper plates for operating at the end of the shoe and side wiper plates for operating at the opposite sides of the shoe beyond said end plates, and said end wiper plates and side wiper plates being relatively adjustable in directions lengthwise of the shoe in response to the relative adjustment of said end and side lasting mechanisms.

4. In a lasting machine, forepart lasting mechanism, opposite shank lasting mechanisms, and means for relatively adjusting said forepart and shank lasting mechanisms lengthwise of a shoe to accommodate shoes of different sizes, said forepart lasting mechanism comprising end wiper plates for operating at the end of the shoe and side wiper plates for operating at the opposite sides of the shoe beyond said end plates, and said side wiper plates and end wiper plates being relatively displaceable in directions lengthwise of the shoe in response to the relative adjustment of said forepart and shank lasting mechanisms to vary the effective lengths of the acting faces of the side plates in operating upon shoes of different sizes.

5. In a lasting machine, the combination with opposite shank lasting mechanisms arranged to act on an upper between the heel breast line and the ball line at opposite sides of a shoe, of end embracing wipers mounted for operative swinging movements each about an axis extending heightwise of the shoe, said wipers comprising end wiper plates for operating at the toe end of the shoe and side wiper blades constructed and arranged to be positioned lengthwise of the shoe relatively to the end wiper plates by said shank lasting mechanisms for operating upon the opposite sides of the forepart of the shoe between said end wiper plates and said shank lasting mechanisms.

6. In a lasting machine, the combination with opposite side lasting mechanisms, of end embracing wipers mounted for operative swinging movements each about an axis extending heightwise of a shoe for wiping over the upper around an end and along the sides of the end of the shoe, said wipers comprising end members arranged to operate at the extreme end of the shoe and additional members slidably movable lengthwise of the shoe relatively to said end members and arranged to be positioned lengthwise of the shoe by said side-lasting mechanisms.

7. In a lasting machine, lasting mechanism comprising a pair of end wiper plates for wiping the margin of an uper over an insole around an end of a shoe, side wiper plates arranged to extend beyond said end plates but to swing with the end plates laterally of the shoe for wiping over the upper along the opposite sides of the shoe, spring means for holding said side plates in extended positions lengthwise of the shoe relatively to the end plates, and means adjustable lengthwise of the shoe and arranged to engage the forward ends of the side plates to determine their positions relatively to the end plates in accordance with the size of the shoe being operated upon.

8. In a lasting machine, lasting mechanism comprising a pair of end wiper plates for wiping the margin of an upper over an insole around the toe end of a shoe, side wiper plates arranged to extend beyond said end plates but to swing with the end plates laterally of the shoe for wiping over the upper at opposite sides of the forepart of the shoe, said side plates being yieldingly held in extended positions lengthwise of the shoe relatively to the end plates, and a pair of adjustable stops for determining the positions of said side plates relatively to the end plates in accordance with the size of the shoe being operated upon.

9. In a lasting machine, end lasting mechanism comprising end wiper members and side wiper members arranged to extend along the sides of a shoe beyond said end wiper members and to swing laterally of the shoe with the end members, said end and side wiper members being relatively movable lengthwise of the shoe, and opposite side lasting mechanisms adjustable in directions lengthwise of the shoe for operating on shoes of different sizes and arranged to vary by such adjustment the relation of the side wiper members to the end wiper members.

10. In a lasting machine, forepart lasting mechanism comprising end wiper members arranged to operate at the toe end of a shoe and side wiper members arranged to operate along the sides of the forepart beyond said end wiper members by swinging movements laterally of the shoe with the end members, the side wiper members being movable lengthwise of the shoe relatively to the end wiper members, and opposite shank lasting mechanisms adjustable in directions lengthwise of the shoe for operating on shoes of different sizes and arranged to vary by such adjustment the relation of the side wiper members to the end wiper members.

11. In a lasting machine, forepart lasting mechanism comprising a pair of end wiper plates arranged to operate at the toe end of a shoe and a pair of side wiper plates arranged to operate along the sides of the forepart beyond said end plates, each end plate and the side plate associated therewith being mounted for operative swinging movement about an axis extending heightwise of the shoe and being relatively movable lengthwise of the shoe, and opposite shank lasting mechanisms adjustable in directions lengthwise of the shoe for operating on shoes of different sizes and arranged to determine by such adjustment the positions of the side plates lengthwise of the shoe relatively to the end plates.

12. In a lasting machine, forepart lasting mechanism comprising a pair of end wiper plates arranged to operate at the toe end of a shoe and a pair of side wiper plates arranged to operate along the sides of the forepart beyond said end plates, each end plate and the side plate associated therewith being mounted for operative swinging movement about an axis extending heightwise of the shoe and being relatively movable lengthwise of the shoe, spring means tending to move the side plates lengthwise of the shoe relatively to the end plates, and opposite side lasting mechanisms adjustable in directions lengthwise of the shoe for operating on shoes of different sizes and arranged to act on the side plates in opposition to said spring means to position the side plates lengthwise of the shoe relatively to the end plates.

13. In a lasting machine, lasting mechanism comprising wiper holders mounted for swinging movements laterally of a shoe each about an axis extending heightwise of the shoe and located substantially at an end of the shoe, end wiper plates secured to said holders for operating at the end of the shoe, side wiper plates mounted on said holders for operating along the sides of the shoe and movable lengthwise of the shoe relatively to the holders, a pair of stops for determining the lengthwise positions of said side plates, and yielding means for holding the side plates in engagement with said stops.

14. In a lasting machine, lasting mechanism comprising wiper holders mounted for swinging movements each about an axis extending heightwise of a shoe, end wipers and side wipers carried by said wiper holders for wiping over an upper around an end and along the sides of the shoe, said side wipers being yieldingly controlled to permit them to be displaced relatively to said end wipers in directions lengthwise of the shoe by pressure on their forward ends to vary the effective lengths of their acting faces in operating on shoes of different sizes, and means arranged to engage the side wipers at their forward ends to determine their lengthwise positions in accordance with the size of the shoe being operated upon.

15. In a lasting machine, lasting mechanism comprising wiper holders, end wipers and side wipers mounted on said wiper holders for wiping over an upper around an end and along the sides of a shoe, said side wipers being displaceable relatively to said end wipers in directions lengthwise of the shoe by pressure on the ends thereof that are farthest from the end of the shoe, means for moving the wiper holders toward the shoe lengthwise and laterally of the shoe, and means adjustable along the sides of the shoe and arranged to engage said ends of the side wipers to hold the side wipers against lengthwise movement during movement of the holders toward the shoe and thus to determine the effective lengths of said wipers in accordance with the size of the shoe.

16. In a lasting machine, end lasting mechanism comprising wiper holders mounted for swinging movements each about an axis extending heightwise of a shoe and each having mounted thereon an end wiper and a side wiper, each side wiper being movable lengthwise of the shoe relatively to the end wiper, and opposite side lasting mechanisms adjustable lengthwise of the shoe for operating on shoes of different sizes and arranged to determine by such adjustment the positions of the side wipers relatively to the end wipers.

17. In a lasting machine, end lasting mechanism comprising wiper holders mounted for swinging movements each about an axis extending heightwise of a shoe and each having mounted thereon an end wiper and a side wiper, each side wiper being movable lengthwise of the shoe relatively to the end wiper, spring means tending to move the side wipers lengthwise of the shoe relatively to the end wipers, and opposite side lasting mechanisms adjustable in directions lengthwise of the shoe for operating on shoes of different sizes and arranged to act on the side wipers against the resistance of said spring means to position the side wipers lengthwise of the shoe relatively to the end wipers.

18. In a lasting machine, the combination with a shoe support, of a pair of stops adjustable lengthwise of a shoe on said support, lasting mechanism comprising end wiper plates, side wiper plates slidingly movable lengthwise of the shoe relatively to said end plates, spring means for holding the side plates in engagement with said stops, and holders common to said end plates and side plates for moving the end plates forwardly toward the shoe lengthwise thereof and for imparting to said end plates and side plates at a predetermined time in the forward movement of the end plates swinging movements laterally of the shoe to wipe over the upper around the end and along the opposite sides of the shoe.

19. In a lasting machine, end embracing wipers comprising end members arranged to operate at an end of a shoe and side members mounted to swing laterally of the shoe with said end members to operate along the sides of the shoe and adjustable lengthwise of the shoe relatively to the end members, of adjustable means for engaging the ends of said side members that are farthest from the end of the shoe to determine their lengthwise positions relatively to the end members, and means for holding the side members yieldingly in engagement with said adjustable means.

20. In a lasting machine, end embracing wipers comprising end wiper plates for operating at an end of a shoe and side wiper plates for operating at the opposite sides of the end of the shoe, said side plates being slidably mounted for yielding movements in directions lengthwise of the shoe relatively to the end plates, operating means tending by its movement to advance and close both the end plates and the side plates lengthwise and laterally of the shoe, and means arranged to engage the ends of the side wiper plates that are farthest from the end of the shoe to hold them against advancing movements while permitting them to close laterally of the shoe with the end plates to wipe over the upper.

21. In a lasting machine, end embracing wipers mounted for swinging movements about an axis at the toe end of a shoe for wiping over the upper around the toe end and at opposite sides of the forepart of the shoe, said wipers comprising end wiper plates and side wiper plates displaceable relatively to said end plates in directions lengthwise of the shoe, operating means to close both the end plates and the side plates laterally of the shoe and also to advance the end plates lengthwise of the shoe, yielding means tending to advance the side plates with the end plates, and means mounted independently of said operating means for holding said side plates against advancing movement to determine their lengthwise positions while permitting them to swing laterally of the shoe to wipe over the upper.

22. In a lasting machine, lasting mechanism comprising end wiper plates for operating at an end of a shoe, side wiper plates for operating at the opposite sides of the end of the shoe beyond the end plates, said side plates being mounted for sliding movements lengthwise of the shoe relatively to said end plates, means to adjust the lengthwise positions of the side plates in accordance with the size of the shoe being operated upon, means for holding said side plates yieldingly in adjusted positions, and means for moving the end plates relatively to the side plates into operative relation to the end of the shoe and for imparting to said end plates and said side plates swinging movements laterally of the shoe in the plane of their wiping faces to wipe over the upper.

23. In a lasting machine, the combination with shoe supporting means, of end embracing wipers, a carrier for moving said wipers lengthwise of the shoe, gear segments mounted on said carrier for swinging said wipers each about an axis at the end of the shoe, a lever for moving said carrier toward the shoe, racks and pinions for operating said gear segments, other levers for operating said racks, and means carried by said first-named lever for swinging said other levers to operate the gear segments in predetermined time relation to the movement of the carrier.

24. In a lasting machine, the combination with a shoe support, of end embracing wipers, a carrier for moving said wipers lengthwise of a shoe on said support, gear segments mounted on said carrier for swinging said wipers each about an axis at the end of the shoe to close them, racks and pinions for operating said gear segments, a pair of levers for operating said racks, a third lever for moving said carrier toward the shoe, and a pair of stops carried by said third lever and arranged during swinging movement of that lever to engage said first-named levers and to swing them to operate the gear segments for imparting closing movements to the wipers, said stops being adjustable to vary the time in the movement of the carrier when the wipers begin their closing movements.

25. In a lasting machine, the combination with a shoe support, of end embracing wipers, a carrier for moving said wipers lengthwise of a shoe on said support, wiper holders mounted on said carrier for swinging movements each about an axis at the end of the shoe for imparting closing movements to said wipers, a lever for moving said carrier toward the shoe, and a pair of levers operatively connected to said wiper holders and arranged to be operated by said first-named lever to impart closing movements to the wipers in predetermined time relation to the movement of the carrier, the portions of said pair of levers that are connected to the wiper holders being movable in directions opposite to the direction of movement of the carrier thus to operate the holders.

26. In a lasting machine, the combination with shoe-positioning means of end embracing wipers, a carrier for moving said wipers lengthwise of the shoe, wiper holders mounted on said carrier for swinging movements to impart closing movements to said wipers, a pair of upwardly extending levers operatively connected at their upper ends to said holders for swinging the holders, said levers having downwardly extending arms, a third lever pivotally mounted below said first-named levers for moving the carrier toward the shoe, and means carried by said third lever for engaging said downwardly extending arms to operate the first-named levers.

27. In a lasting machine, the combination with shoe positioning means, of end embracing wipers, a carrier for moving said wipers lengthwise of the shoe, wiper holders mounted on said carrier for swinging movements to impart closing movements to said wipers, a pair of upwardly extending levers operatively connected at their upper ends to said holders for swinging the holders, said levers having downwardly extending arms, a third lever pivotally mounted below said first-named levers for moving the carrier toward the shoe, and a pair of stops carried by said third lever for engaging the downwardly extending arms of said first-named levers to swing their upper ends in directions opposite to the direction of movement of the carrier for closing the wipers, said stops being adjustable to vary the time in the movement of the carrier when the wipers begin their closing movements.

28. In a lasting machine, the combination with shoe positioning means, of end embracing wipers, a carrier for moving said wipers lengthwse of the shoe, mechanisms on said carrier for closing the wipers laterally of the shoe, a pair of levers supported independently of the carrier for operating said wiper closing mechanisms, and a third lever arranged to move said carrier toward the shoe and also to operate said pair of levers.

29. In a lasting machine, the combination with shoe positioning means, of end embracing wipers, a carrier for moving said wipers lengthwise of the shoe, mechanisms on said carrier for closing the wipers laterally of the shoe, a pair of levers supported independently of the carrier for operating said wiper closing mechanisms, a third lever arranged to move said carrier toward the shoe and also to operate said pair of levers to close the wipers, and means for varying the time in the movement of said third lever when the closing of the wipers begins.

30. In a lasting machine, the combination with shoe positioning means, of end embracing wipers, a carrier for moving said wipers lengthwise of the shoe, wiper holders mounted on said carrier for swinging movements each about an axis at the end of the shoe for imparting closing movements to said wipers, a lever for moving said carrier toward the shoe, and a pair of levers operatively connected to said wiper holders and arranged to be swung by said first-named lever to operate the holders for imparting closing movements to the wipers.

31. In a lasting machine, the combination with shoe positioning means, of end embracing wipers, a carrier for moving said wipers lengthwise of the shoe, wiper holders mounted on said carrier for swinging movements to impart closing movements to said wipers, a pair of levers operatively connected to said holders for swinging them, a third lever for moving the carrier toward the shoe, and means carried by said third lever for engaging said first-named levers at a predetermined time in the movement of the carrier and for swinging them to operate the wiper holders.

32. In a lasting machine, the combination with shoe positioning means, of end embracing wipers, a carrier for moving said wipers lengthwise of the shoe, wiper holders mounted on said carrier for swinging movements to impart closing movements to said wipers, a pair of levers operatively connected to said holders for swinging them, a third lever for moving the carrier toward the shoe, and means carried by said third lever for swinging said first-named levers to operate the wiper holders, said means being adjustable to vary the extent of the swinging movements imparted to said first-named levers and thus to vary the extent of the closing movements imparted to the wipers.

33. In a lasting machine, the combination with shoe positioning means, of end embracing wipers, a carrier for moving said wipers lengthwise of the shoe, wiper holders mounted on said carrier for swinging movements to impart closing movements to said wipers, a pair of levers operatively connected to said holders for swinging them, a third lever for moving the carrier toward the shoe, an arm carried by said third lever, and a pair of stops carried by said arm for engaging said first-named levers and for swinging them to operate the wiper holders to impart closing movements to the wipers, said stops being adjustable to vary the time in the movement of the carrier when the wipers begin their closing movements, and said arm being adjustable to vary the extent of the closing movements imparted to the wipers.

34. In a lasting machine, the combination with shoe supporting means, of end embracing wipers, a carrier on which said wipers are mounted for swinging movements laterally of the shoe to close them, mechanism on said carrier for closing the wipers comprising pinions for operating the wipers and racks for engaging the pinions, operating means for moving the carrier together with the racks to carry the wipers bodily toward the shoe, a controlling lever for each rack mounted for free swinging movement in a direction to permit the rack to move with the carrier toward the shoe, and means carried by said operating means for engaging said controlling levers at a predetermined time in the movement of the carrier to stop the movements of the racks, said last-named means being arranged thereafter to impart to said levers swinging movements in a direction to move the racks relatively to the carrier and thus to cause the wipers to close a predetermined distance during the continued movement of the carrier.

35. In a lasting machine, the combination with shoe supporting means, of end embracing wipers, a carrier for moving said wipers lengthwise of the shoe, wiper holders mounted on said carrier for swinging movements to impart closing movements to said wipers, three pivotally mounted levers arranged respectively to move the carrier toward the shoe and to operate the wiper holders to close the wipers laterally of the shoe, one of said levers being connected to the carrier and the other two levers being operatively connected each to one of the holders, a cam for imparting operative movement to said carrier-operating lever, and means carried by said last-named lever for imparting swinging movements to said other levers to close the wipers at a predetermined time in the movement of the carrier.

36. In a lasting machine, the combination with shoe supporting means, of end embracing wipers, a carrier for moving said wipers lengthwise of the shoe, wiper holders mounted on said carrier for swinging movements to impart closing movements to said wipers, three pivotally mounted levers arranged respectively to move the carrier toward the shoe and to operate the wiper holders to close the wipers laterally of the shoe, one of said levers being connected to the carrier and the other two levers being operatively connected each to one of the holders, a cam for imparting operative movement to said carrier-operating lever, and means carried by said last-named lever for imparting swinging movements to said other levers to close the wipers, said means being adjustable to vary the amount of swinging movements imparted to said other levers and thus to vary the amount of closing movements of the wipers and further adjustable to vary the time in the movement of the carrier when the wipers begin their closing movements.

37. In a lasting machine, the combination with shoe supporting means, of members at opposite sides of the shoe for laying the margin of the upper inwardly over an insole on a last, said members being shaped to conform substantially to the lateral and heightwise curvatures of the opposite edges of the insole on the last, and a pair of members curved similarly to said overlaying members for engaging the insole adjacent to its opposite edges and for pressing it against the last prior to the overlaying operations, said last-named members being adjustable toward and from each other laterally of the last to accommodate shoes of different widths.

38. In a lasting machine, the combination with shoe supporting means, of members at opposite sides of the shoe for laying the upper inwardly over an insole on a last, a holddown for depressing the shoe relatively to said overlaying members by engagement with the insole, and a pair of members carried by said holddown for engaging the shank portion of the insole close to its opposite edges and for pressing it against the last as the shoe is depressed by said holddown, said last-named members being adjustable laterally of the last toward and from each other to accommodate shoes of different widths.

39. In a lasting machine, the combination with shoe supporting means, of a device for laying the shoe upper inwardly over the side margin of an insole on a last, and means for pressing the margin of the insole yieldingly against the last prior to the overlaying operation comprising a spring-controlled slide movable toward the insole in a rectilinear path substantially perpendicular to the bottom face of the insole, a member carried by said slide for engaging the insole adjacent to its marginal edge, said member being displaceable by the overlaying device in the overlaying operation, and means for adjusting said member laterally of the shoe.

40. In a lasting machine, the combination with shoe supporting means, of a device for laying the shoe upper inwardly over the side margin of an insole on a last, and means for pressing the margin of the insole against the last prior to the overlaying operation comprising a power-operated member movable toward the insole, a spring-controlled slide carried by said member, a member pivotally connected to said slide for engaging the insole adjacent to its marginal edge, and means carried by the slide for adjusting said last-named member laterally of the shoe.

41. In a lasting machine, the combination with shoe supporting means, of members at opposite sides of the shoe for laying the margin of the shoe upper inwardly over an insole on a last, a holddown arranged to engage the insole at the opposite ends of the shoe and to impart to the shoe heightwise movement, means carried by the holddown for pressing the shank portion of the insole against the last comprising a pair of members shaped to conform substantially to the lateral and heightwise curvatures of the opposite bottom edges of the last, said last-named members being movable as a unit laterally of the shoe into different positions for operating upon right and left shoes, and means for independently adjusting said members laterally of the shoe to vary their spaced-apart relation to accommodate shoes of different widths.

42. In a lasting machine, the combination with shoe supporting means, of members at opposite sides of the shoe for laying the margin of the shoe upper inwardly over an insole on a last, a power-operated member movable toward the shoe heightwise thereof, a pair of arms carried by said member for engaging the insole at the opposite ends of the shoe and for depressing the shoe relatively to said overlaying members, said arms being relatively adjustable lengthwise of the shoe to accommodate shoes of different lengths, and a pair of members carried by one of said arms and movable into position to press the shank portion of the insole adjacent to its opposite marginal edges against the last during the depression of the shoe, said last-named members being movable inwardly over the shoe bottom in the overlaying operation in response to the pressure of the overlaying members thereon.

43. In a lasting machine, the combination with shoe supporting means, of devices at opposite sides of the shoe for laying the margin of the shoe upper inwardly over an insole on a last, a power-operated member movable toward the shoe heightwise thereof, a pair of arms carried by said member for engaging the insole at the opposite ends of the shoe and for depressing the shoe relatively to said overlaying devices, said arms being relatively adjustable lengthwise of the shoe to accommodate shoes of different lengths, a slide carried by one of said arms and mounted for movements in directions laterally of the shoe, a pair of spring-controlled slides carried by said first-named slide and mounted for movements in directions heightwise of the shoe, a pair of members pivotally connected to said second-named slides for engaging the shank portion of the insole near its opposite marginal edges, adjustable means carried by said spring-controlled slides for moving said members toward each other to vary their spaced-apart relation to accommodate shoes of different widths, spring means for holding said members in adjusted positions, and means for locking said first-named slide to said arm in different positions to determine the lateral positions of said shank-engaging members for operating on right and left shoes.

44. In a lasting machine, the combination with lasting means, of toe and heel rests for supporting a shoe against pressure on the shoe bottom, members connected respectively to said toe and heel rests and relatively movable in response to pressure of the shoe on both said rests independently of any relative movement of said rests, and a spring arranged to be subjected to stress by the relative movement of said members.

45. In a lasting machine, the combination with lasting means, of means for supporting a shoe against pressure on the shoe bottom comprising toe and heel rests movable in a direction heightwise of the shoe in response to pressure of the shoe thereon, members connected respectively to said toe and heel rests and movable respectively in opposite directions in response to the movement of said rests in the same direction, and a spring arranged to be subjected to stress by the opposite movements of said members.

46. In a lasting machine, the combination with lasting means, of shoe supporting means comprising depressible toe and heel rests relatively movable in directions heightwise of the shoe to adjust themselves to the shoe, means movable to clamp a shoe on said rests and to depress the shoe and the rests to position the bottom of the shoe in a predetermined relation to said lasting means, and connections between said rests arranged to permit their relative movements, said connections including a spring against the resistance of which both said rests are thus depressible.

47. In a lasting machine, the combination with lasting means, of shoe supporting means comprising depressible toe and heel rests relatively movable in directions heightwise of the shoe, means movable to clamp a shoe on said rests and to depress the shoe and the rests to position the bottom of the shoe in a predetermined relation to said lasting means, a lever fulcrumed between its ends and connected at one end to one of said rests, and a connection between the other end of said lever and the other of said rests including a spring arranged to be subjected to stress by the depression of each of the rests.

48. In a lasting machine, the combination with lasting means, of shoe supporting means comprising toe and heel rests relatively movable in directions heightwise of the shoe and arranged to support the shoe at its opposite ends against pressure on the shoe bottom, a spring for pressing said toe and heel rests toward the shoe, and means for substantially equalizing the pressure of said spring on said rests.

49. In a lasting machine, the combination with lasting means, of shoe supporting means comprising a pair of rests for supporting a shoe at its opposite ends, said rests being relatively adjustable in directions lengthwise of the shoe and relatively movable heightwise of the shoe, a a member for clamping a shoe on said rests and movable to depress the shoe and said rests to position the shoe with its bottom face in a predetermined relation to said lasting means, a spring against the resistance of which said rests are thus depressible, and means for substantially equalizing the pressure of said spring on said rests.

50. In a lasting machine, the combination with toe end lasting means comprising wipers and means to operate them to wipe over an upper around the toe end of a shoe, of shoe supporting means comprising a pair of rests for supporting the shoe at its opposite ends bottom upward, said rests being relatively movable in directions heightwise of the shoe to permit the shoe to be positioned with the bottom face of its forepart portion in a plane substantially parallel with said wipers, mechanism connecting said rests and arranged to permit them to be thus relatively moved, said mechanism including a spring controlling both rests, and means arranged to engage the shoe bottom and to depress the shoe and the rests against the resistance of said spring to lower the shoe to the proper level for the operation of said wipers.

51. In a lasting machine, the combination with lasting means, of means for supporting a shoe against pressure on the shoe bottom comprising toe and heel rests relatively movable in directions heightwise of the shoe to adjust themselves to the shoe, a comparatively light spring arranged to control both said rests and to be subjected to stress by pressure on the shoe bottom, and heavier springs arranged further to control said different rests respectively and to be subjected to stress after said light spring to press the shoe against the lasting means.

52. In a lasting machine, the combination with lasting means, of means for supporting a shoe against pressure on the shoe bottom comprising toe and heel rests relatively movable in directions heightwise of the shoe to adjust themselves to the shoe, members connected respectively to said toe and heel rests and relatively movable in response to pressure of the shoe on both the rests, a comparatively light spring arranged to be subjected to stress by the relative movement of said members, means for locking said members against further relative movement, and heavier springs arranged further to control said different rests respectively and to be subjected to stress after the locking of said members to press the shoe against the lasting means.

53. In a lasting machine, the combination with lasting means, of means for supporting a shoe against pressure on the shoe bottom comprising toe and heel rests relatively movable in directions heightwise of the shoe to adjust themselves to the shoe, a lever fulcrumed between its ends and connected at one end to one of said rests, a connection between the other end of said lever and the other of said rests including a comparatively light spring arranged to be subjected to stress by pressure of the shoe on both the rests, heavier springs arranged further to control said different rests respectively and to be compressed to force the shoe against the lasting means, and means for preventing further yield of said light spring to permit the compression of said heavier springs.

54. In a lasting machine, the combination with lasting means, of shoe supporting means comprising a toe post, a heel post, rests carried by said posts for supporting a shoe at its opposite ends bottom upward against downward pressure, said posts being relatively movable in directions heightwise of the shoe to position the shoe in proper relation to the lasting means, mechanism connecting said posts and arranged to permit them to be thus relatively moved, said mechanism including a light spring arranged to press said posts upwardly, a pair of heavy springs surrounding said posts between said mechanism and said rests, a member for clamping a shoe on said rests and for depressing the shoe against the resistance of said light spring, and means for preventing further yield of said light spring and for thereafter operating said mechanism to apply upward pressure to said rests through said heavy springs to press the bottom of the shoe against the lasting means.

55. In a lasting machine, the combination with toe end lasting means comprising wipers and means to operate them to wipe over an upper around the toe end of a shoe, of shoe supporting means comprising toe and heel posts, rests carried by said posts for supporting a shoe and last at its opposite ends bottom upward, heavy springs surrounding said posts, mechanism connecting said posts below said heavy springs and including a light spring arranged to press said posts upwardly, a holddown arranged to engage the bottom of the shoe and to depress the shoe against the resistance of said light spring to position the shoe in operative relation to said wipers prior to the overwiping operation and also to depress the shoe after the margin of the upper has been laid inwardly over the insole, and automatic means for locking said light spring against further yield and for operating said mechanism to apply upward pressure to said rests through said heavy springs to increase the pressure of the wipers on the margin of the upper in the overlaying operation and then to relax the pressure of said heavy springs and to unlock said light spring to permit it to come into operation after the wipers have completed their overwiping operation and prior to the depression of the shoe by said holddown.

56. In a lasting machine, the combination with a shoe support, of end embracing wipers for wiping over an upper around an end of a shoe on said support, means for imparting to the shoe and said support by engagement with the bottom of the shoe a movement in a direction heightwise of the shoe to position the shoe in operative relation to said wipers, and a member movable into engagement with the opposite end of the shoe substantially at the end of such movement to support the shoe against the thrust of the wipers in the overwiping operation.

57. In a lasting machine, the combination with a shoe support, of end embracing wipers, means to advance and close the wipers about the toe end of a shoe on said support to wipe over the margin of the upper, means for imparting to the shoe and said support by engagement with the bottom of the shoe a movement in a direction heightwise of the shoe to position the shoe in operative relation to said wipers, a member movable into engagement with the heel end of the shoe to support the shoe against the thrust of the wipers, and means for imparting to said member its shoe engaging movement prior to the overwiping operation and for locking it in shoe-supporting position.

58. In a lasting machine, the combination with a shoe support, of toe-end lasting means comprising wipers and means to operate them to wipe the margin of the upper of a shoe on said support inwardly over an insole, a holddown for engaging the bottom of the shoe to impart to said shoe and support a movement in a direction heightwise of the shoe to position the shoe in operative relation to said wipers, a member for supporting the shoe against the thrust of the wipers by engagement with its heel end, and automatic means for moving said member yieldingly into engagement with the heel end of the shoe substantially at the end of the heightwise movement of the shoe and for locking it in shoe-supporting position.

59. In a lasting machine, the combination with a shoe support, of toe-end lasting means comprising wipers and means to operate them to wipe the margin of the upper of a shoe on said support inwardly over an insole, a holddown for engaging the bottom of the shoe, means for operating said holddown to impart to said shoe and support a movement in a direction heightwise of the shoe to position the shoe in operative relation to said wipers, a member movable in directions lengthwise of the shoe for engaging the heel end of a shoe to support the shoe against rearward movement, means operative in time relation to the heightwise movement of the shoe for imparting to said member its movement into engagement with the shoe prior to the overwiping operation, and a locking device controlled by said last-named means for locking said member in shoe-supporting position.

60. In a lasting machine, the combination with toe-end lasting means comprising wipers and means to operate them to wipe the margin of an upper inwardly over an insole, of a holddown for depressing the shoe to position it in operative relation to said wipers, and heel-end supporting means comprising a slide movable lengthwise of the shoe, a device carried by said slide for engaging the heel end of the shoe, operating means for imparting to said slide its lengthwise movement comprising a spring and a member movable relatively to the slide against the resistance of said spring upon engagement of said device with the shoe, and means automatically operative in response to such movement of the member relatively to the slide to lock the slide in shoe-supporting position.

61. In a lasting machine, the combination with toe-end lasting means comprising wipers and means to operate them to wipe the margin of an upper inwardly over an insole, of means for positioning a shoe in operative relation to said wipers, and means for supporting the shoe against the thrust of the wipers comprising a slide movable in directions lengthwise of the shoe, a member carried by said slide for engaging the heel end of the shoe, a block pivotally connected to said slide, a shouldered rod slidably mounted in said block, a spring for holding said rod with its shoulder in engagement with said block, power-operated means for moving said rod in one direction to move the slide through said spring toward the work to force said shoe supporting member yieldingly into engagement with the heel end of the shoe and in the opposite direction to move said slide and member through said block positively out of shoe engaging position, and a locking device controlled by the movement of said rod for locking said member and slide in shoe-supporting position.

62. In a lasting machine, the combination with a shoe support, of means for laying the margin of the toe end of the upper of a shoe on said support inwardly over an insole, grippers for gripping the margin of the toe end of the upper, means for imparting to the shoe and said support by engagement with the bottom of the shoe movement relatively to said grippers in a direction heightwise of the shoe to cause the grippers to pull the upper, a member for engaging the heel end of the shoe to hold the shoe against lengthwise movement in the overlaying operation, and automatic means for moving said member lengthwise of the shoe into engagement with its heel end when the heightwise movement of the shoe has been substantially completed.

63. In a lasting machine, end embracing wipers for wiping over an upper around the toe end and along the sides of the toe portion of a shoe, grippers associated with said wipers and comprising separate pairs of jaws for gripping the margin of the upper around the end and at opposite sides of the end of the shoe, said wipers and grippers being fixed against relative movement in directions heightwise of the shoe, and means for moving the shoe heightwise relatively to said wipers and grippers to tension the upper and to position the shoe in operative relation to said wipers.

64. In a lasting machine, end embracing wipers for wiping over an upper around the toe end and along the sides of the toe portion of a shoe, grippers associated with said wipers for gripping the margin of the upper around the end and at opposite sides of the end of the shoe, said grippers being movable inwardly toward the edge of the shoe bottom in a plane substantially parallel with the shoe bottom in response to the pull of the upper thereon, and means for moving the shoe heightwise relatively to said wipers and grippers to tension the upper and to position the shoe in operative relation to said wipers.

65. In a lasting machine, the combination with end embracing wipers for wiping over an upper around the toe end and along the sides of the toe portion of a shoe, of means for depressing the shoe to position it in operative relation to said wipers, and means to pull the upper during depression of the shoe comprising grippers spaced about the end of the shoe and each movable in the upper-pulling operation inwardly toward the edge of the shoe bottom along the plane of the wipers in a direction substantially perpendicular to the edge of the shoe bottom.

66. In a lasting machine, the combination with end embracing wipers for wiping over an upper around the toe end and along the sides of the toe portion of a shoe, of means for moving the shoe heightwise to position it in operative relation to said wipers, and means to pull the upper during such movement of the shoe comprising grippers for gripping the margin of the upper around the end and along the sides of the end of the shoe, said grippers being movable inwardly in a plane parallel with the wipers and in directions substantially normal to the edge curvature of the shoe bottom in response to the pull of the upper thereon, and springs against the resistance of which the grippers are thus movable.

67. In a lasting machine, shoe supporting means, a movable wiper carrier, wipers mounted on said carrier for wiping over an upper around the toe end and along the sides of the toe portion of a shoe, a holddown for depressing the shoe to position it in operative relation to said wipers, a plurality of grippers on said carrier for gripping the margin of the upper around the end and along the sides of the end of the shoe, said grippers being movable inwardly toward the edge of the shoe bottom in a plane substantially parallel to the plane of the bottom face of the forepart of the shoe, and springs against the resistance of which the grippers are thus movable in response to the pull of the upper thereon in the depression of the shoe.

68. In a lasting machine, shoe supporting means, a wiper carrier, wipers mounted on said carrier for wiping over an upper around the toe end and along the sides of the forepart of a shoe, a holddown for depressing the shoe to position it in operative relation to said wipers, a plurality of slides on said carrier movable inwardly toward the edge of the shoe bottom in a plane substantially parallel to the plane of the wipers, grippers carried by said slides for gripping the margin of the upper around the toe end and at opposite sides of the forepart of the shoe, and springs for holding said slides initially against inward movements and yieldable in response to the pull of the upper on the grippers in the depression of the shoe.

69. In a power-operated machine for lasting shoes with cement, the combination with means for supporting a last with an upper and an insole assembled thereon, of grippers for gripping the margin of the upper, means for effecting relative movement of said grippers and the last heightwise of the last to pull the upper, means for clamping the upper to the last to hold it after it has been pulled, means for laying the marginal portion of the upper inwardly over the insole, and automatic means for bringing the machine to a stop after the upper-pulling operation with the upper held by said clamping means to permit cement to be applied to its marginal portion.

70. In a power-operated machine for lasting shoes with cement, the combination with means for supporting a last with an upper and an insole assembled thereon, of grippers for gripping the margin of the toe portion of the upper, means for effecting relative movement of said grippers and the last heightwise of the last to pull the upper, a toe band for clamping the upper to the last around the toe, wipers for wiping the margin of the toe end of the upper inwardly over the insole, and automatic means for bringing the machine to a stop after the upper-pulling operation with the toe band in clamping position to permit cement to be applied to the marginal portion of the upper.

71. In a power-operated machine for lasting shoes with cement, the combination with means for supporting a last with an upper and an insole assembled thereon, of grippers for gripping the margin of the upper, means for effecting relative movement of said grippers and the last heightwise of the last to pull the upper, wipers for wiping the margin of the upper inwardly over the insole, wiper-operating means constructed to move the wipers inwardly far enough to clamp the upper against the edge of the insole while the grippers are still holding the upper, and automatic means for bringing the machine to a stop when the wipers are thus in clamping engagement with the upper at the edge of the insole to permit cement to be applied to the marginal portion of the upper.

72. In a power-operated machine for lasting shoes with cement, the combination with means for supporting a last with an upper and an insole assembled thereon, of grippers for gripping the margin of the upper around the toe end and at opposite sides of the end of the last, a hold-down for moving the last heightwise by engagement with the insole to cause the grippers to pull the upper over the last, the grippers being releasable manually from the upper after the upper-pulling operation, toe end clamping means arranged to clamp the upper around the end of the last and during the heightwise movement of the last to upwipe the upper over the last, end embracing wipers for wiping the margin of the upper inwardly over the insole, and automatic means for stopping the operation of the machine after the heightwise movement of the last to permit the operator to operate the grippers to release the upper and to apply cement to the margins of the upper materials.

73. In a machine for lasting shoes with cement, means for supporting a last bottom upward with an upper and an insole assembled thereon, grippers for gripping the margin of the upper around the toe end and at opposite sides of the end of the last, end embracing wipers for wiping over the upper about the toe end and along the sides of the end portion of the shoe, a holddown for depressing the last by engagement with the insole to cause the grippers to pull the upper over the last and to position the shoe in operative relation to said wipers, the grippers being releasable manually from the upper after the upper-pulling operation, and automatic means for stopping the operation of the machine at the beginning of the overwiping operation to permit the operator to release the grippers from the upper and to apply cement to the margins of the upper materials and again after the overwiping operation has been completed to permit setting of the cement.

74. In a machine for lasting shoes with cement, means for supporting a last bottom upward with an upper and an insole assembled thereon, grippers for gripping the margin of the upper around the toe end and at opposite sides of the end of the last, a holddown for depressing the last by engagement with the insole to cause the grippers to pull the upper over the last, the grippers being releasable manually from the upper after the upper-pulling operation, toe end clamping means for clamping the upper about the end of the last and during the depression of the shoe for upwiping the upper, end embracing wipers for wiping the margin of the upper inwardly over the insole around the toe, power-operated means for operating the toe end clamping means to release the upper and for withdrawing the holddown at the beginning of the overwiping operation, and automatic means for stopping the operation of the machine at the beginning of the overwiping operation to permit the operator to release the grippers from the upper and to apply cement to the margins of the upper materials and again after the overwiping operation has been completed to permit setting of the cement.

75. A lasting machine having, in combination, means for supporting a last with an upper and an insole assembled thereon, grippers for gripping the margin of the upper at the forepart, means for moving the last heightwise relatively to said grippers to cause them to pull the upper, and shank lasting devices arranged to engage the upper at opposite sides of the last and during the heightwise movement of the last to wipe the upper over the sides of the last toward the edge of the insole.

76. A lasting machine having, in combination, means for supporting a last bottom upward with an upper and an insole assembled thereon, grippers for engaging the margin of the upper around the toe end and at opposite sides of the forepart, means for depressing the last by engagement with the insole to cause the grippers to pull the upper over the last, and shank lasting devices arranged to engage the upper yieldingly on opposite sides of the last initially below the bottom face of the last and during depression of the last to upwipe the upper over the last, said devices being movable thereafter to lay the opposite marginal portions of the upper inwardly over the insole.

77. A lasting machine having, in combination, means for supporting a last with an upper and an insole assembled thereon, grippers for gripping the margin of the upper at the opposite sides of the forepart, means for moving the last heightwise relatively to said grippers to cause them to pull the upper, shank lasting devices arranged to engage the upper at the opposite sides of the last and during the heightwise movement of the last to wipe the upper over the sides of the last toward the edge of the insole, said devices being movable inwardly toward each other along the inwardly extending curvatures of the sides of the last, and means for moving said side grippers inwardly toward each other by the inward movements of said shank lasting devices.

78. A lasting machine having, in combination, means for supporting a last bottom upward with an upper and an insole assembled thereon, grippers for engaging the margin of the upper around the toe end and at opposite sides of the forepart, means for depressing the last by engagement with the insole to cause the grippers to pull the upper over the last, shank lasting wipers arranged to engage the upper yieldingly at opposite sides of the last and during depression of the last to wipe the upper over the last, said wipers being movable inwardly toward each other along the inwardly extending curvatures of the sides of the last, and connections between said shank lasting wipers and the grippers at the opposite sides of the last for moving said grippers inwardly with the wipers.

79. A lasting machine having, in combination, means for supporting a last bottom upward with an upper and an insole assembled thereon, a holddown for depressing the last by engagement with the insole, shank lasting wipers arranged to engage the upper yieldingly at opposite sides of the last and during the depression of the last to upwipe the upper over the last, said wipers being movable inwardly toward each other along the inwardly extending curvatures of the sides of the last, grippers located at opposite sides of the last forwardly of the wipers for tensioning the upper over the last during the upwiping operation, and connections between the wipers and the grippers arranged to cause the grippers to partake of the inward movements of the wipers.

80. A lasting machine having, in combination, means for supporting a last with an upper and an insole assembled thereon, shank lasting means comprising members shaped to conform substantially to the curvatures of the opposite side edges of the insole and arranged yieldingly to engage the upper at opposite sides of the last when the work is initially presented to the machine, and means for effecting relative movement of the said lasting means and the last in a direction heightwise of the last to cause said lasting means to wipe the upper over the sides of the last toward the edge of the insole.

81. In a machine for lasting shoes with cement, the combination with means for supporting a last bottom upward with an upper and an insole positioned thereon, of means for depressing the last by engagement with the insole, and shank lasting mechanism comprising wipers having upper-engaging portions of yieldable material and arranged yieldingly to clamp the upper against the opposite sides of the last below the bottom edge of the insole when the work is presented to the machine and during the depression of the last to upwipe the upper by frictional contact therewith toward the edge of the insole, said wipers being thereafter movable inwardly over the insole to lay the margins of the upwiped portions against the insole in position to adhere thereto through the action of cement.

82. A lasting machine having, in combination, means for supporting a last bottom upward with an upper and an insole assembled thereon, shank lasting means comprising devices extending substantially from the heel breast line forwardly to the ball line at opposite sides of the shoe, said devices being shaped to conform substantially to the curvatures of the opposite side edges of the insole and being arranged yieldingly to engage the upper below the bottom face of the insole when the work is presented to the machine, and means for effecting relative movement of said lasting devices and the last in a direction heightwise of the last to cause said devices to wipe the upper over the sides of the last toward the edge of the insole.

83. In a lasting machine, the combination with shoe supporting means, of means for depressing the shoe by engagement with its insole, shank lasting mechanism comprising wipers at opposite sides of the shoe shaped to conform substantially to the curvatures of the opposite bottom edges of the insole, and means for forcing the wipers yieldingly into engagement with the opposite shank portions of the shoe to cause the wipers to work the upper toward the bottom face of the insole during the depression of the shoe and then to move inwardly over the insole at the completion of the upwiping operation to lay the margin of the upper against the insole.

84. A lasting machine having, in combination, shoe supporting means, means for depressing the shoe by engagement with its insole, shank lasting mechanism comprising wipers at opposite sides of the shoe, said wipers being shaped to conform substantially to the curvatures of the opposite side edges of the insole, means for effecting a relative movement of adjustment between the wipers and the shoe in directions lengthwise of the shoe, spring means for holding said wipers in engagement with the opposite sides of the shoe to cause said wipers to upwipe the upper during the depression of the shoe, and means for increasing the stress of said spring means after the upwiping operation has been completed to force the wipers inwardly over the bottom face of the insole to lay the margins of the upwiped portions of the upper against the insole.

85. In a lasting machine, a shoe support, means for depressing the shoe by engagement with its insole, shank lasting mechanisms comprising wipers at opposite sides of the shoe shaped to conform substantially to the curvatures of the opposite side edges of the shank portion of the insole, spring means for holding said wipers against the sides of the shoe to cause the wipers to work the upper toward the edge of the insole during the depression of the shoe, and cam-operated means for increasing the stress of said spring means to force the wipers inwardly over the insole at the completion of the upwiping operation to lay the margins of the upwiped portions of the upper against the insole.

86. In a lasting machine, means for supporting a last at its opposite ends bottom upward with an upper and an insole thereon, shank lasting mechanisms comprising wipers at opposite sides of the last, spring means for forcing said wipers toward the last to clamp the upper against the sides of the last below the edge of the insole, a holddown arranged to engage the bottom face of the insole, means for operating the holddown to depress the shoe to cause the wipers to work the upper toward the edge of the insole, said last-named means being constructed to impart to said holddown a movement of predetermined extent and then to come to rest with the bottom face of the insole in position to permit said wipers to move inwardly over the insole, and means for increasing the stress of said spring means to force the wipers inwardly over the insole to lay the margins of the upwiped portions against the insole.

87. In a machine for lasting shoes, means for supporting a last at its opposite ends bottom upward with an upper and an insole assembled thereon, shank lasting mechanisms comprising wipers at opposite sides of the last, said wipers having flexible work-engaging faces shaped to conform substantially to the lateral curvatures of the opposite side edges of the insole and to the longitudinal curvature of the bottom face of the insole, spring means for forcing said wipers toward the last to clamp the upper against the sides of the last, and a holddown arranged to engage the bottom face of the insole and to impart to the last a movement in a direction to cause the wipers to work the upper toward the edge of the insole, said holddown being arranged to come to rest with the bottom face of the insole in a position to permit the wipers to move inwardly to lay the margins of the upwiped portions of the upper against the insole.

88. In a machine for lasting shoes, means for supporting a last at its opposite ends bottom upward with an upper and an insole assembled thereon, wipers at opposite sides of the last, said wipers having flexible work-engaging faces shaped to conform substantially to the lateral curvatures of the opposite side edges of the shank portion of the insole and to the longitudinal curvature of the bottom face of the insole, means for adjusting the wipers simultaneously lengthwise of the last to position them in proper relation to the shank portion of the last, spring means for holding the wipers in engagement with the upper at opposite sides of the last, and a holddown for depressing the shoe by engagement with the insole to cause the wipers to work the upper toward the edge of the insole.

89. In a machine for lasting shoes with cement, shoe supporting means, shank lasting mechanism comprising wipers at opposite sides of the shoe shaped to conform substantially to the curvatures of the opposite side edges of the insole, spring means for forcing said wipers against the sides of the shoe, a holddown for depressing the shoe by engagement with the insole to cause the wipers to wipe the upper over the last at opposite sides of the shoe, means for increasing the pressure of said spring means to cause the wipers to move inwardly over the insole to lay the margins of the upper against the insole, and automatic means for stopping the operation of the machine prior to the overlaying operation to permit cement to be applied to the margins of the upper.

90. In a machine for lasting shoes with cement, a shoe support, shank lasting means comprising wipers at opposite sides of the shoe shaped to conform substantially to the curvatures of the opposite side edges of the insole, spring means for holding said wipers against the opposite sides of the shoe, a holddown for depressing the shoe by engagement with the insole to cause the wipers to wipe the upper toward the edge of the insole, means for increasing the stress of said spring means to force the wipers inwardly over the insole to lay the margins of the upper against the insole, and automatic means for stopping the operation of the machine prior to the overlaying operation to permit cement to be applied to the marginal portions of the upper and again after the overlaying operation has been completed to permit setting of the cement.

91. A lasting machine having, in combination, toe end lasting means constructed and arranged to position shoes of different sizes lengthwise in the machine by engagement with their toe end faces, and means adjustable toward and from said toe end lasting means for lasting the opposite shank portions of the shoes.

92. A lasting machine having, in combination, toe end lasting means constructed and arranged to position shoes of different sizes lengthwise in the machine by engagement with their toe end faces, means for lasting the opposite shank portions of the shoes, and means for relatively adjusting the toe end and shank lasting means to accommodate shoes of different sizes.

93. A lasting machine having, in combination, end embracing wipers for wiping over an upper around an end of a shoe, means adjustable relatively to said wipers for lasting the opposite sides of the shoe, and an end embracing band adjustable relatively to said wipers in directions lengthwise of the shoe, said band being arranged to act as a stop to determine the lengthwise positions of shoes of different sizes in the machine by engagement with their end faces.

94. In a lasting machine, end embracing wipers for wiping over the upper around the toe end of a shoe, a toe end embracing band arranged to be held initially in open position and to locate shoes of different sizes lengthwise in the machine by engagement with their end faces, and means for engaging a shoe and last at opposite ends thereof to support them for the operation of the machine, said means being constructed and arranged to permit the shoe and last to be moved lengthwise in the machine to position the shoe with its toe end face in engagement with said band.

95. In a lasting machine, the combination with end embracing wipers for wiping over an upper around the toe end of a shoe, of a toe end embracing band adjustable relatively to said wipers in directions lengthwise of the shoe and arranged to act as a stop to determine the lengthwise positions of shoes of different sizes in the machine by engagement with their end faces, and a pair of rests for supporting the shoe and last at its opposite ends and relatively to which the shoe and last may be moved to position the shoe with its toe end against said band.

96. In a lasting machine, the combination with toe embracing wipers mounted for swinging movements laterally of a shoe about an axis located at the toe end of the shoe, of a toe embracing band mounted below said wipers and arranged to act as a stop to locate shoes of different sizes lengthwise in the machine by engagement with their end faces, a support for the central portion of the band adjustable in directions lengthwise of the shoe, and means for swinging the band relatively to said support laterally of the shoe to clamp the upper about the end of the shoe prior to the overwiping operation.

97. A lasting machine having, in combination, toe end lasting means including a toe band constructed and arranged to position shoes of different sizes lengthwise in the machine by engagement with their toe end faces, a heel end supporting member, and means for imparting to said member a movement in a direction lengthwise of the shoe into supporting relation to the heel end of the shoe in the course of the operation of the machine.

98. A lasting machine having, in combination, end embracing wipers for wiping over an upper around the toe end of a shoe, a toe band for clamping the upper about the end of the shoe, said band being constructed and arranged to act as a stop for positioning a shoe lengthwise when presented to the machine, means for imparting to the shoe a movement in a direction heightwise of the shoe to position the shoe in operative relation to said wipers, and a member movable into engagement with the heel end of the shoe substantially at the end of such movement to support the shoe against the thrust of the wipers in the overwiping operation.

99. In a machine for lasting shoes in which the marginal portion of the upper is secured in lasted relation to an insole by an adhesive, means for gripping the margin of the upper and pulling it lengthwise and heightwise of the last at the forepart, a device for wiping the upper around the toe end of the last heightwise of the last toward the edge of the insole in the course of the upper-pulling operation, means for laying the margin of the upper around the forepart inwardly over the insole in position to adhere thereto, and means for wiping the upper at the opposite sides of the shank portion of the last heightwise of the last toward the edge of the insole and for thereafter laying the margin of that portion of the upper inwardly over the insole in position to adhere to the insole.

100. In a machine for lasting shoes in which the marginal portion of the upper is secured in lasted relation to an insole by an adhesive, grippers for gripping the margin of the upper at the toe end and at the opposite sides of the toe end portion of a last, a holddown for moving the last heightwise relatively to the grippers by engagement with the insole to cause the upper to be pulled lengthwise and heightwise of the last at the forepart, a device for upwiping the upper around the toe end of the last as the last is moved by said holddown, means for laying the margin of the forepart of the upper inwardly over the insole in position to adhere to the insole after the last has been moved by said holddown, and means for upwiping the upper also during the heightwise movement of the last along the opposite sides of the shank portion of the last and for thereafter laying its marginal portion inwardly over the insole and pressing it into position to adhere to the insole.

101. In a machine for lasting shoes in which the marginal portion of the upper is secured to an insole by an adhesive, grippers for gripping the margin of the upper at the toe end and at the opposite sides of the toe end portion of a last, a holddown for depressing the last relatively to the grippers by engagement with the insole to cause the upper to be pulled lengthwise and heightwise of the last at the forepart, a member for clamping the upper around the toe end of the last and for wiping the upper toward the edge of the insole as the last is depressed by said holddown, devices for clamping the upper against the last at the opposite sides of the shank portion and for wiping the upper toward the edge of the insole during the depression of the last, said devices being movable inwardly over the insole after the last has been depressed by said holddown to lay the margin of the upper over the insole, wipers for wiping the margin of the upper inwardly over the insole around the forepart, and means for increasing the pressure of said wipers and devices on the overlaid margin of the upper to force it into firm adherence to the insole.

CHARLES F. PYM.